(12) United States Patent
Maruyama et al.

(10) Patent No.: US 8,481,849 B2
(45) Date of Patent: Jul. 9, 2013

(54) ELECTROLYTE FOR PHOTOVOLTAIC DEVICE AS WELL AS PHOTOVOLTAIC DEVICE AND DYE-SENSITIZED SOLAR CELL INCLUDING THAT ELECTROLYTE

(75) Inventors: Tsukasa Maruyama, Hiratsuka (JP); Yuko Sekine, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1583 days.

(21) Appl. No.: 10/585,121

(22) PCT Filed: Mar. 30, 2005

(86) PCT No.: PCT/JP2005/006716
§ 371 (c)(1),
(2), (4) Date: Jun. 30, 2006

(87) PCT Pub. No.: WO2005/096392
PCT Pub. Date: Oct. 13, 2005

(65) Prior Publication Data
US 2007/0275546 A1 Nov. 29, 2007

(30) Foreign Application Priority Data

Mar. 31, 2004 (JP) .................. 2004-105439
Apr. 16, 2004 (JP) .................. 2004-121735
Jan. 7, 2005 (JP) .................. 2005-002587
Jan. 12, 2005 (JP) .................. 2005-005332

(51) Int. Cl.
*H01L 31/00* (2006.01)
(52) U.S. Cl.
USPC ............................ 136/263; 136/243; 136/252
(58) Field of Classification Search
USPC .................. 136/263, 243, 252, 256
See application file for complete search history.

(56) References Cited

U.S. PATENT DOCUMENTS 4,927,721 A    5/1990  Gratzel et al.
5,188,768 A *  2/1993  Sotomura .............. 252/519.34
(Continued)

FOREIGN PATENT DOCUMENTS

EP    1 164 603 A2    12/2001
EP    1 339 127 A1    8/2003
(Continued)

OTHER PUBLICATIONS

"The novel polymer electrolyte nanocomposite composed of poly-(ethylene oxide), lithium triflate and mineral clay" published in Polymer 42 (2001) 9763-9769 by Chen et al.*

(Continued)

*Primary Examiner* — Basia Ridley
*Assistant Examiner* — Heng Chan
(74) *Attorney, Agent, or Firm* — Novak Druce Connolly Bove + Quigg LLP

(57) ABSTRACT

An electrolyte for a photovoltaic device including (i) a layered clay mineral and/or an organically modified layered clay mineral and (ii) an ionic liquid as well as a photovoltaic device including a photoelectrode including a transparent conducting layer and a metal oxide semiconductor mesoporous film using, as an electrolyte layer, the same, a counter electrode facing this photoelectrode and an electrolyte layer arranged between the photoelectrode and the counter electrode as well as a dye-sensitized solar cell composed of a photovoltaic device and a photosensitizer carried on a metal oxide semiconductor mesoporous film of the photovoltaic device, wherein the conductive substrate is obtained by coating, on a conductive substrate, a conductive polyaniline dispersion stably dispersed in an organic solvent including (A) a polyaniline obtained by polymerization of aniline or an aniline derivative, (B) a sulfonic acid compound and/or (C) an organic polymer having a protonic acid group, (D) a molecular weight modifier, and (E) an organic solvent capable of dissolving the sulfonic acid compound (B), the organic polymer having a protonic acid group (C), and the molecular weight modifier (D).

20 Claims, 2 Drawing Sheets

U.S. PATENT DOCUMENTS

| | | | |
|---|---|---|---|
| 5,232,631 A | | 8/1993 | Cao et al. |
| 5,624,605 A | | 4/1997 | Cao et al. |
| 5,626,795 A | | 5/1997 | Smith et al. |
| 6,409,893 B1 | | 6/2002 | Holzbock et al. |
| 6,475,663 B1 | | 11/2002 | Möhwald et al. |
| 2005/0072462 A1 | * | 4/2005 | Kang et al. ............... 136/263 |
| 2005/0260786 A1 | * | 11/2005 | Yoshikawa et al. ......... 438/85 |

FOREIGN PATENT DOCUMENTS

| | | | |
|---|---|---|---|
| EP | 1 536 508 A1 | | 6/2005 |
| EP | 1622178 A1 | * | 2/2006 |
| FR | 2 841 255 A1 | | 12/2003 |
| JP | 62105378 | | 5/1987 |
| JP | 06-009799 | | 1/1994 |
| JP | 6-279584 A | | 10/1994 |
| JP | 10245453 A | * | 9/1998 |
| JP | 2001-43908 | | 2/2001 |
| JP | 2001-522898 | | 11/2001 |
| JP | 2002-175842 | | 6/2002 |
| JP | 2002-298935 A | | 10/2002 |
| JP | 2003-176409 A | | 6/2003 |
| JP | 2003-272439 A | | 9/2003 |
| WO | WO-95/18456 A1 | | 7/1995 |
| WO | WO-99/24991 | | 5/1999 |
| WO | WO 03/054894 | * | 7/2003 |
| WO | WO-03/054894 A1 | | 7/2003 |
| WO | WO-2004/017452 A1 | | 2/2004 |
| WO | WO 2004017452 A1 | * | 2/2004 |

OTHER PUBLICATIONS

Ionic Liquids webpage attachment (http://www.iolitec-usa.com/Ionic-Liquids/12-dimethyl-3-propylimidazolium.html).*

Organic Chemistry Portal webpage attachment (http://www.organic-chemistry.org/topics/ionic-liquids.shtm).*

TCI America webpage attachment (http://www.tciamerica.com/catalog/E0556.html).*

"The novel polymer electrolyte nanocomposite composed of poly(ethylene•oxide), lithium triflate and mineral clay" Chen et al., *Polymer* 42 (2001) pp. 9763-9769.

"Li ion conductors based on laponite/poly(ethylene oxide) composites" Doeff et al., *Solid State Ionics* 113-115 (1998) pp. 109-115.

Office Action dated Mar. 27, 2013 issued in corresponding European Application No. 05728642.

* cited by examiner

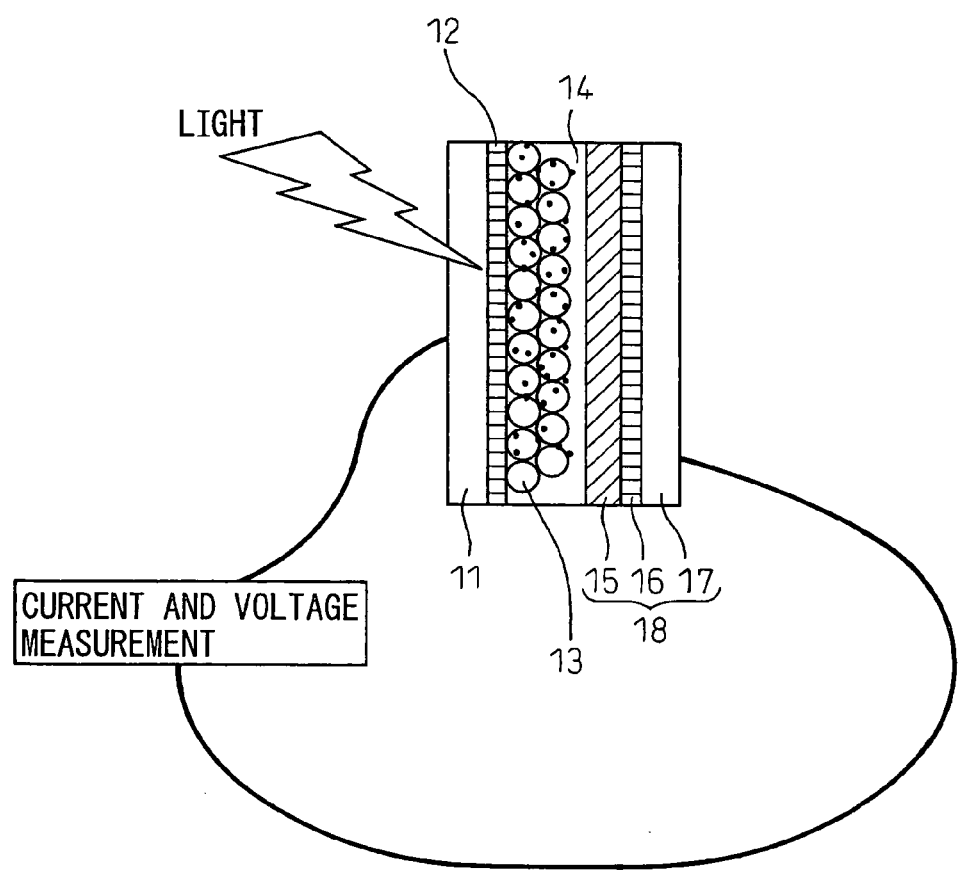

ELECTROLYTE FOR PHOTOVOLTAIC DEVICE AS WELL AS PHOTOVOLTAIC DEVICE AND DYE-SENSITIZED SOLAR CELL INCLUDING THAT ELECTROLYTE

TECHNICAL FIELD

The present invention relates to an electrolyte for a photovoltaic device and a photovoltaic device and dye-sensitized solar cell using that electrolyte.

BACKGROUND ART

A photovoltaic device is an element which converts light energy to electrical energy and is utilized as for example a solar cell. As an example of such a solar cell, silicon-based solar cells or compound semiconductor solar cells may be mentioned, but recently dye-sensitized solar cells, which can be produced cheaper than these solar cells, are becoming the focus of attention. However, a dye-sensitized solar cell is an electrochemical cell, so an organic electrolyte or ionic liquid is used as an electrolyte (for example see U.S. Pat. No. 4,927,721). When using an organic electrolyte, there is the problem that the energy conversion efficiency ends up falling during long term use due to evaporation and depletion. Further, when using an ionic liquid as the electrolyte, while it is possible to prevent evaporation and depletion over long term use, there is a problem of leakage (for example see WO95/18456). It is also known to use a substantially organic solvent-free solid or gel-like organic electrolyte for the electrolyte of a photoelectrochemical cell (for example see Japanese Unexamined Patent Publication (Kokai) No. 2002-298935).

It is known to obtain a conductive polymer containing electrolyte ions as a dopant by chemical oxidative polymerization of aniline or an aniline derivative. However, a conductive polyaniline is generally insoluble in an organic solvent and non-melting and therefore, is inferior in shapeability and difficult to develop applications thereof. Further, it has been reported to obtain polyaniline and polyaniline derivatives soluble in an organic solvent by polymerization of a salt of an aniline comprising sulfonic acid such as dodecylbenzene sulfonic acid, dinonylnaphthalene sulfonic acid and aniline or its derivative (Japanese Unexamined Patent Publication (Kokai) No. 6-279584 No. 2003-176409, U.S. Pat. No. 5,232,631). However, the solubility of polyaniline or a polyaniline derivative in an organic solvent is not necessarily high. For example, the solubility of aniline dodecylbenzene solfonate in toluene or xylene is at most 0.5%. Thus, a method for producing polyaniline having a further higher solubility is sought. Further, a conductive polymer composition comprised of a substituted or unsubstituted polyaniline, protonic acid, and organic solvent has been reported (for example see Japanese Unexamined Patent Publication (Kokai) No. 2003-176409), but the oxidizing agent/aniline (molar ratio) at the time of polymerization of the aniline is 0.5, so there is the problem that the yield of the polyaniline is 30 to 40%. If making the oxidizing agent/aniline (molar ratio) 1.0 or more, there is the problem that the dispersion stability becomes insufficient.

A photovoltaic device is composed of a photoelectrode and a counter electrode. In the past, as the counter electrode, an electrode composed of a platinum thin film formed on a transparent conductive glass substrate by vacuum vapor deposition or sputtering has been used. However, vacuum vapor deposition or sputtering requires expensive vacuum equipment. Further, the size of the substrate is strictly restricted, so it is difficult to form a platinum layer on a substrate of a large area.

The dye-sensitized solar cell was developed by M. Graetzel et al. of Switzerland. Among solar cells using organic materials, it has the advantages that it is high in photovoltaic conversion efficiency and is lower in manufacturing cost compared with silicon-based solar cells and, therefore, is gaining attention as a new type of solar cell. In particular, since no high temperature treatment is required at the time of production like with a crystalline silicon solar cell, there is active research being conducted for development of a flexible film-type dye-sensitized solar cell.

DISCLOSURE OF THE INVENTION

Accordingly, the object of the present invention is to provide an electrolyte for a photovoltaic device free from the problems of evaporation and depletion of the electrolyte even at the time of long-term use, free from the problem of leakage, superior in power generating effect and exhibiting a performance equal to or better than a photovoltaic device using a conventional ionic liquid-containing electrolyte, and a photovoltaic device using the same.

Another object of the present invention is to provide a photovoltaic device capable of being easily obtained inexpensively at a high yield, using a dispersion of a conductive polyaniline stably dispersed in an organic solvent and exhibiting a performance equal to, or better than, a counter electrode having a conventional platinum thin film.

A further object of the present invention is to provide a dye-sensitized solar cell using the above photovoltaic device.

In accordance with the present invention, there is provided an electrolyte for a photovoltaic device comprising (i) a layered clay mineral and/or organically modified layered clay mineral and (ii) an ionic liquid.

In accordance with the present invention, there is also provided a photovoltaic device wherein the above an electrolyte for a photovoltaic device is arranged, as an electrolyte layer, between a photoelectrode comprising a transparent conductive electrode and a metal oxide semiconductor mesoporous film and a counter electrode arranged facing the above photoelectrode.

In accordance with the present invention, there is further provided a dye-sensitized solar cell comprising the above photovoltaic device and a photosensitizing dye carried on a metal oxide semiconductor mesoporous film on the element.

In accordance with the present invention, there is further provided a photovoltaic device and a dye-sensitized solar cell using a conductive substrate, which is obtained by coating, on a substrate having a conductive film on the surface thereof, a conductive polyaniline dispersion stably dispersed in an organic solvent comprising (A) a polyaniline obtained by polymerization of aniline or an aniline derivative, (B) a sulfonic acid compound and/or (C) an organic polymer having a protonic acid group, (D) a molecular weight modifier (for example, an aniline derivative having a substituent at the 4-position of the aniline) and (E) an organic solvent capable of dissolving the sulfonic acid compound (B), the organic polymer having a protonic acid group (C) and the molecular weight modifier (D).

According to the present invention, by using a non-free-flowing electrolyte such as a solid or gel-like electrolyte composed of (i) a layered clay mineral and/or an organically modified layered clay mineral and (ii) an ionic liquid, it is possible to obtain a photovoltaic device having a performance equal to, or better than, a conventional electrolyte composed of an ionic liquid and also having free of leakage of liquid.

According to the present invention, further a dye-sensitized solar cell using, as a photovoltaic device, a clay-containing electrolyte produced by mixing a swelled dispersion of a layered clay mineral and/or a organically modified layered clay mineral and an ionic liquid, followed by removing the swelling solvent of the clay mineral, exhibits a performance equal to, or better than, a cell of an ionic liquid-containing electrolyte and, without leakage of liquid and also exhibits a higher energy conversion efficiency compared with an electrolyte produced by adding and mixing a layered clay mineral and/or an organically modified layered clay mineral and an ionic liquid, and, therefore, an electrolyte obtained by mixing a swelled dispersion of a layered clay mineral and/or an organically modified layered clay mineral and an ionic liquid can prevent leakage of the electrolyte and can provide a dye-sensitized solar cell having a superior safety and durability.

According to the present invention, it is possible to obtain a conductive substrate using a conductive polyaniline dispersion stably dispersed in an organic solvent, which can be produced easily at a low cost and a high yield, and the conductive substrate thus obtained gives a performance equal to, or better than, a counter electrode using a platinum thin film conventionally used as a photovoltaic device.

BRIEF EXPLANATION OF THE DRAWINGS

The present invention will now be explained in detail with reference to the drawings, wherein:

FIG. 2 is a view of the basic configuration of a cell of the present invention used in the Examples, etc.

BEST MODE FOR CARRYING OUT THE INVENTION

Figure 1:
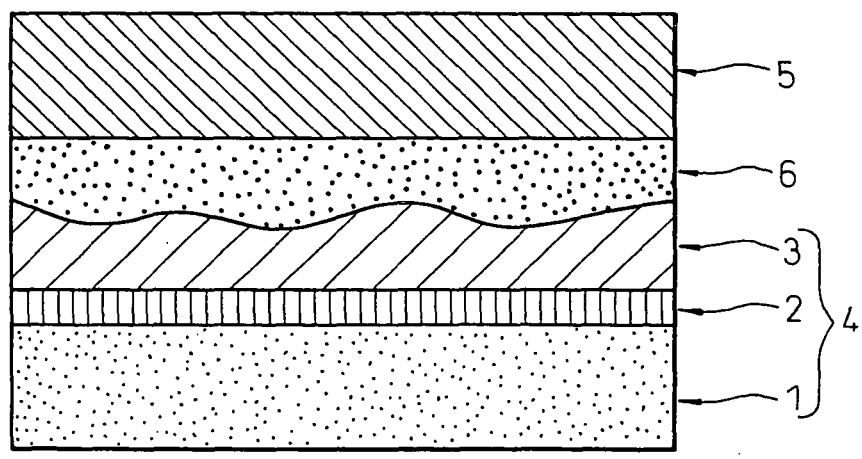
FIG. 1 is a view of an example of the basic configuration of a dye-sensitized solar cell of the present invention.

In the description and the claims of this application, the singular form (e.g., a, an, the) also includes the plural form except that a singular form is clear from the context.

According to the first aspect of the present invention, as a photovoltaic device electrolyte, a nonfree-flowing electrolyte such as a solid or gel-like electrolyte including (i) a layered clay mineral and/or an organically modified layered clay mineral and (ii) an ionic liquid is used. The layered clay mineral and/or an organically modified layered clay mineral is not particularly limited in a ratio of composition with the ionic liquid so long as the electrolyte does not become a so-called liquid (i.e., free-flowing), but from the viewpoint of the properties as a photovoltaic device and prevention of leakage, the ratio of (i) the layered clay mineral and/or the organically modified layered clay mineral/(ii) the ionic liquid (weight ratio) is preferably 0.01/100 to 70/100, more preferably 0.05/100 to 50/100.

According to the second aspect of the present invention, after a swelled dispersion of (i) a layered clay mineral and/or an organically modified layered clay mineral and (ii) an ionic liquid were mixed, the solvent was removed to produce a clay-containing electrolyte. By fabricating a dye-sensitized solar cell using a photovoltaic device containing the clay-containing electrolyte produced above, the inventors found that a dye-sensitized solar cell can be obtained, which exhibits a performance equal to, or better than, a conventional ionic liquid-containing electrolyte cell, which is free from leakage, and which exhibits further higher energy conversion efficiency, compared with an electrolyte produced by mixing the above-mentioned layered clay mineral and/or organically modified layered clay mineral and ionic liquid. Thus, according to the second aspect of the present invention, the electrolyte obtained by mixing a swelled dispersion of (i) a layered clay mineral and/or an organically modified layered clay mineral and (ii) an ionic liquid provides a cell capable of preventing leakage of the electrolyte and exhibits superior safety and durability.

In the second aspect of the present invention, by swelling and dispersing a layered clay mineral at, for example, a concentration of 0.01 to 50 wt % in water or a mixed solvent of water and an alcohol such as methanol, ethanol, isopropanol, etc.; a keton such as, acetone, methylethylketone, etc; a nitrile such as acetonitrile, propylnitrile, etc.; an amide such as, dimethylformamide, etc.; and other high polarity organic solvents; or an organically modified layered clay mineral in a solvent of an aromatic hydrocarbon such as toluene, xylene, etc.; an ether such as tetrahydrofuran, methylcellusolve, etc; a ketone such as acetone, methylethylketone, etc.; an aliphatic hydrocarbon such as hexane, cyclohexane, etc; an alcohol such as ethanol, isopropanol, etc; a halogen-based hydrocarbon, such as chloroform, dichloromethane, etc.; an ester such as ethyl acetate, dibutyl phthalate, etc.; a sulfoxide such as dimethylformamide, N-methylpyrrolidone amides, dimethylsulfoxide, etc; followed by adding and mixing in an ionic liquid, and removing the solvent, a clay-containing electrolyte can be produced.

The ratio of mixture of the layered clay mineral and the ionic liquid is not particularly limited and may be suitably selected depending upon the intended object. For example, while the ratio of the layered clay mineral and the ionic liquid is not particularly limited, the layered clay mineral/the ionic liquid (weight ratio) of 0.01/100 to 70/100 is preferable, while 0.05/100 to 50/100 is more preferable.

The ratio of mixture of the organically modified layered clay mineral and the ionic liquid is not particularly limited either and may be suitably selected depending upon the intended object, but the ratio of mixture illustrated for the above layered clay mineral is preferable. Further, as the solvent for preparing a swelled dispersion of an organically modified layered clay mineral, an ionic liquid, instead of an organic solvent, may also be used.

Among photovoltaic devices, solar cells, which are one of the photo electromotive force elements, are remarkably noted, as a clean power generating system. In particular, the dye-sensitized solar cell was developed by M. Graetzel et al. of Switzerland and, among solar cells using organic materials, has the advantages that it is high in photovoltaic conversion efficiency and is lower in manufacturing cost compared with silicon-based solar cells and therefore is gaining attention as a new type of solar cell. FIG. 1 shows an example of the typical configuration of a dye-sensitized solar cell. As typical examples of a dye-sensitized solar cell include a ruthenium complex dye-sensitized type titanium dioxide solar cell. Explaining the configuration of a cell taking, as an example, this ruthenium complex dye-sensitized type titanium dioxide solar cell, shown in FIG. 1, a transparent substrate 1 such as glass is provided on one surface thereof with a transparent conducting layer 2 (for example, a fluorine-doped tin oxide film). On the top thereof, an oxide semiconductor mesoporous film 3 is formed composed of titanium oxide or other oxide semiconductor particles and carrying a photosensitizer (for example, a ruthenium complex dye). The transparent substrate 1, transparent conducting layer 2, and oxide semiconductor mesoporous film 3 form a photoelectrode 4. A counter electrode 5 is arranged facing this photoelectrode 4. It is possible to arrange the electrolyte layer 6 composed of the electrolyte of the present invention between the photoelectrode 4 and the counter electrode 5.

In this dye-sensitized solar cell, when light such as sunlight strikes the cell from the transparent substrate 1 side, electromotive force is generated between the photoelectrode 4 and counter electrode 5, electrons flow from the photoelectrode 4 to the counter electrode 5, and power is generated. As shown in FIG. 2, the counter electrode 18 used is composed of a conductive substrate 17 such as a metal substrate or a non-conductive substrate 17 such as a glass substrate, on which a conducting layer such as platinum, gold, carbon, is formed, or after a glass substrate or other non-conductive substrate is laminated with a conductive metal oxide film 16, a conducting layer 15 such as platinum and/or gold and/on carbon is laminated. In particular, platinum has large catalytic action enabling smooth movement of electrons from the counter electrode 18 to the electrolyte 14, a counter electrode 18 having a platinum thin film is largely used.

A counter electrode 5 or 18 having a platinum thin film thereon has conventionally been obtained forming a platinum thin film 15 on a substrate by vacuum vapor deposition or sputtering (Japanese Unexamined Patent Publication (Kokai) No. 2000-173680 and Japanese Unexamined Patent Publication (Kokai) No. 2000-36330). However, platinum is an expensive precious metal more expensive than gold. When using sputtering or vacuum vapor deposition to form a counter electrode 5 or 18 having a platinum thin film, there is wasteful in the consumption of materials, the productivity is low, a vacuum facility is required, the capital cost is high, and the production cost becomes higher. Alternatively, a counter electrode 5 or 18 having a platinum thin film may be formed by the method of dipping a substrate into a platinum solution such as a chloroplatinic acid solution to coat the substrate with the platinum solution, followed by sintering, or by coating a platinum solution on a substrate by spraying, followed by sintering (Japanese Unexamined Patent Publication (Kokai) No. 2001-250595). Dipping and spraying may also be said to be simple methods since they do not require vacuum facilities, but to convert a platinum solution coated on a substrate to a platinum thin film, sintering at about 400° C. is required, and therefore there was the defect that this method cannot be applied to a substrate weak against heat.

Further, a counter electrode formed with a conductive polymer thin film, instead of a platinum thin film, has also been reported (Japanese Unexamined Patent Publication (Kokai) No. 7-226527 and Japanese Unexamined Patent Publication (Kokai) No. 2003-313317). As a method of forming a conductive polymer thin film, a method of using electrochemical polymerization to form a conductive polymer thin film on a substrate, or a method of coating a conductive polymer dispersion or solution on a substrate, may be exemplified. Regarding the "conductive polymer solution" used herein, the mixture of the state of conductive polymer particles dispersed in a solvent and the state of a conductive polymer dissolved in a solvent is, for convenience, defined as a "conductive polymer solution". With electrochemical polymerization, since the substrate which can be used is restricted to a conductive substrate or the area of the substrate which can be used is restricted, it is difficult to form a large area conductive polymer thin film on the substrate. Further, as a conductive polymer particle dispersion or conductive polymer solution, for example, a poly(3,4-ethylenedioxythiophene) aqueous dispersion (e.g., Baytron P made by Bayer), a sulfonated polyaniline aqueous solution (e.g. Aquasave made by Mitsubishi Rayon), etc. may be exemplified. However, synthesis of the monomer was troublesome. Further, as a polyaniline solution, an N-methylpyrrolidone solution of a polyaniline has been reported, but the method of preparation of the solution was troublesome or, since the polyaniline thin film obtained from a polyaniline solution is an insulator, an operation for doping to convert it to a conductor was necessary and not simple (see Japanese Unexamined Patent Publication (Kokai) No. 3-28229 and U.S. Pat. No. 5,728,321). Further, an organic solvent dispersion of a conductive polyaniline has been reported in Japanese Unexamined Patent Publication (Kokai) No. 6-279584 or Japanese Unexamined Patent Publication (Kokai) No. 2003-277500, but the dispersability thereof to an organic solvent was not necessarily high (see Japanese Unexamined Patent Publication (Kokai) No. 6-279584) or the method of preparation of the dispersion was troublesome. Further, the conductive polymer thin film formed with the conductive polymer particle dispersion or conductive polymer solution did not exhibit a performance as good as a platinum thin film.

As the layered clay mineral usable in the first and second aspects of the present invention, the use of a phyllosilicate with a silicate tetrahedron bonded in the form of a two-dimensional sheet is preferable, specifically, for example, smectite-based clay minerals such as montmorillonite, saponite, beidellite, nontronite, hectorite, stevensite, or vermiculite-based clay minerals vermiculite, mica such as muscovite, phlogopite, and other natural or synthetic clay minerals may be exemplified. Among these, a smectite-based clay mineral swelling in water and having an anion exchange ability, swelling mica, etc. are preferably used. The amount of anion exchange of these layered clay minerals is preferably 10 to 300 ml equivalents/100 g. In the present invention, in particular natural montmorillonite made by Kunimine Industries (product name Kunipia F), synthetic smectite made by Kunimine Industries (Sumecton SA), synthetic swelling mica made by Co-op Chemical (product name Somasif ME-100), synthetic smectite (Lucentite SWN, SWF) are suitably used. As the layered clay mineral usable when producing the organically modified layered clay mineral used in the first and second aspects of the present invention, those illustrated above may be utilized.

The organically modified layered clay mineral according to the present invention can be obtained by a general anion exchange between layers. For example, it may be obtained by adding organic onium ions to an aqueous slurry of the above-mentioned clay mineral, completing the reaction under stirring, then filtering, washing, and drying the resultant mixture. Here, the "organic onium ions" mean, in compounds having elements having isolated electron pairs such as, oxygen, sulfur, nitrogen, ions generated from organic onium compounds, which are produced by coordinate bonding of these isolated electron pairs with proton or other cation type reagents, etc.

The organic onium ions are not particularly limited so long as the organically modified layered clay mineral composed of a layered clay mineral with exchangeable inorganic ions replaced with organic onium ions can be dispersed and thicken in the following ionic liquids, but ammonium ions, phosphonium ions, oxonium ions, sulfonium ions, etc. may be mentioned. Among these, ammonium ions are most generally used. Preferably, quaternary ammonium ions, specifically aliphaticammonium ions, pyridium ions, quinolinium ions, imidazolium ions, pyrrolidinium ions, piperidinium ions, betaines, lecithin, cationic dyes, etc. may be illustratedly used. Preferably, the aliphatic ammonium ions shown in the following formula (I) or (II), for example, hydroxypolyoxyethylenetrialkyl ammonium, hydroxypolyoxypropylenetrialkylammonium, di(hydroxypolyoxyethylene)dialkylammonium, di(hydroxypolyoxypropylene)dialkylammonium, dimethyldioctylammonium, dimethyldidodecyl ammonium, methylethyldioctylammonium, methylethyldioctylammonium, methyltrioctylammonium, methyltridodecylammonium, benzylmethyldioctylammonium, benzylmethyldidodecylammonium, benzylethyldioctylammonium, benzylethyldidodecylammonium, benzyltrioctylammonium, benzyltridodecylammonium, etc. may be exemplified. The organic onium salt including organic onium ions, for example, is a salt composed of an anion such as $Cl^-$, $BR^-$, $I^-$, $NO_3^-$, $OH^-$, $CH_3COO^-$, $CH_3SO_3^-$. As the organic onium salt for preparing the organically modified layered clay mineral of the present invention, a commercially available product (for example the Ethoquad series and Arquad series made by Lion and the Adekacol CC series made by Asahi Denka) may be used. As the organically modified layered clay mineral of the present invention, a commercially available product (e.g., Lucentite SEN, SPN, STN, etc. made by Co-op Chemical) may be used.

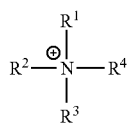

(I)

wherein $R^1$ indicates a $C_1$ to $C_{30}$ hydrocarbon group, $R^2$ and $R^3$ independently indicate a polyoxyethylene group $(-(CH_2CH_2O)_n-H)$, a polyoxypropylene group $(-(CH_2CH(CH_3)O)_n-H, -(CH_2CH_2CH_2O)_n-H)$ or a $C_1$ to $C_{10}$ hydrocarbon group, $R^4$ indicates a polyoxyethylene group $(-(CH_2CH_2O)_n-H)$ or a polyoxypropylene group $(-(CH_2CH(CH_3)O)_n-H, -(CH_2CH_2CH_2O)_n-H)$ and n=1 to 50.

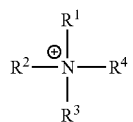

(II)

wherein $R^1$ indicates a methyl group or benzyl group, $R^2$ indicates a $C_1$ to $C_3$ hydrocarbon group or a $C_6$ to $C_{15}$ hydrocarbon group, and $R^3$ and $R^4$ independently indicate a $C_6$ to $C_{15}$ hydrocarbon group.

The conditions for organic modification of a layered clay mineral by organic onium ions according to the first and second aspects of the present invention are not particularly limited, but it is preferably organically modified by reacting 0.3 to 2.0 weight times of organic onium ions, more preferably 0.5 to 1.5 weight times, based upon the preferable amount of anion exchange of the layered clay mineral, preferably at a temperature of 10 to 95° C.

The ionic liquid usable in the first and second aspects of the present invention is not particularly limited. It is possible to use any ionic liquid used as an electrolyte in the past. Specifically, those described in Ono Hiroyuki ed., *Ionic Liquid—Front Edge and Future of Development—*, edited by Hiroyuki Ono, CMC Shuppan (2003), *Creation of Functions and Applications of Ionic Liquids*, NTS (2004), etc., quaternary' ammonium salts, imidazolium salts, pyridium salts, pyrrolidinium salts, piperidinium salts, etc. (As the salt, for example, a salt comprised of $I^-$, $BF_4^-$, $PF_6^-$, $CF_3COO^-$, $CF_3SO_3^-$, $N(CF_3SO_2)_2^-$, $N(CN)_2^-$, $C(CN)_3^-$, and other anions may be exemplified) may be mentioned. As preferable ionic liquids, there are aliphatic quaternary ammonium salts, imidazolium salts, pyridinium salts, and pyrrolidinium salts. Particularly preferable are imidazolium salts shown in the following formula (III).

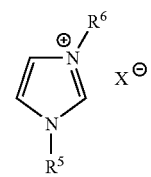

(III)

wherein $R^5$ indicates a methyl group or ethyl group, $R^6$ indicates a $C_1$ to $C_8$ hydrocarbon group and X indicates an anion such as $I^-$, $BF_4^-$, $PF_6^-$, $CF_3COO^-$, $CF_3SO_3^-$, $N(CF_3SO_2)_2^-$, $N(CN)_2^-$, $C(CN)_3^-$, etc.

When an electrolyte produced from (a) a layered clay mineral and/or an organically modified layered clay mineral or (b) a swelled dispersion of a layered clay mineral and/or an organically modified layered clay mineral and an ionic liquid according to the present invention is used as a photovoltaic device electrolyte, a redox couple is preferably used at the same time. The redox couple is not particularly limited, but iodine/iodide ions, bromine/bromide ions, etc. may be used. For example, iodine and a metal iodide such as LiI, NaI, KI, iodine and iodide salts of quaternary imidazolium compounds, iodide salts of quaternary pyridinium compounds, iodide salts of tetraalkyl ammonium compounds, and other iodine/iodide ion couples or bromine and a metal bromide such as LiBr, NaBr, KBr, bromine and bromide salts of quaternary imidazolium compounds, bromide salts of quaternary pyridinium compounds, bromide salts of tetraalkylammonium compounds, and other bromine/bromide ions, ferrocyanate-ferricyanate, ferrocene-ferricinium, and other metal complexes, disulfide compound and sulfur compounds of mercapto compounds, hydroquinone, quinone, etc. may be exemplified. Preferably, a redox couple of iodine and an iodide salt is preferable. These redox couples may be used alone or in any combination thereof.

For the electrolyte produced according to the present invention, in addition to the above-mentioned essential ingredients, a solvent which is not capable of liquefying a solid or gel-like electrolyte composed of a layered clay mineral and/or an organically modified layered clay mineral and an ionic liquid may be used. As the usable solvent, for example, ethylene carbonate, propylene carbonate and other carbonic acid esters; ethyleneglycol dialkyl ether, propyleneglycol dialkyl ether and other ethers; ethyleneglycol monoalkyl ether, propyleneglycol monoalkyl ether and other alcohols; ethyleneglycol, propyleneglycol and other polyhydric alcohols; propylnitrile, methoxypropylnitrile, cyanoethyl ether and other nitriles; dimethylformamide, N-methylpyrrolidone and other amides; dimethylsulfoxide, sulforan; and other aprotonic polar solvents, etc. may be exemplified. Further, these solvents may be used alone or in any combinations thereof.

Further, an inorganic salt may also be added for the purpose of improving the short-circuit photocurrent of a photovoltaic device. As preferable inorganic salts, alkali metal salts and alkali earth metal salts, specifically lithium iodide, sodium iodide, potassium iodide, magnesium iodide, potassium iodide, lithium trifluoroacetate, sodium trifluoroacetate, lithium thiocyanate, lithium tetrafluoroborate, lithium hexafluorophosphate, lithium perchlorate, lithium trifluoromethane sulfonate, lithium bis(trifluoromethanesulfonyl) imide, etc. may be exemplified. They may be used alone or in any combination thereof. Further, to improve the open-circuit photovoltage of the photovoltaic device, it is also possible to add pyridines and benzimidazoles. Specifically, methylpyridine, ethylpyridine, propylpyridine, butylpyridine, and other alkylpyridines, methylimidazole, ethylimidazole, propylimidazole and other alkylimidazoles may be exemplified. The amounts added are not particularly limited, but may be made the amounts as in the past so far as not adversely affecting the objects of the present invention.

A photovoltaic device and dye-sensitized solar cell shown in FIG. 1 will now be explained.

As shown in the above, the photoelectrode 4 is composed of a transparent substrate 1, a transparent conducting layer 2 and an oxide semiconductor mesoporous film 3. The usable transparent substrate 1 may be a resin substrate such as a glass substrate or a polystyrene, polyethylene, polypropylene, polyethylene terephthalate, polyethylene naphthalate, polycarbonate, polyphenylenesulfide, cyclic olefin polymer, polyether sulfone, polysulfone, polyether imide, polyacrylate, triacetyl cellulose, polymethyl methacrylate. The substrate having a good light transmission property is preferable.

As the transparent conducting layer 2, an antimony- or fluorine-doped tin oxide, aluminum- or potassium-doped zinc oxide, tin-doped indium oxide, or other conductive metal oxide may be exemplified. The thickness of the conducting layer is preferably about 0.01 to 10 μm. The method of providing the conducting layer may be a conventional method. For example, coating, spattering, vacuum vapor deposition, spray pyrolysis, chemical vapor deposition (CVD), sol gel, etc. may be mentioned.

The oxide semiconductor mesoporous film 3 is obtained by coating a dispersion of oxide semiconductor particles on a transparent conducting layer 2. As the oxide semiconductor particles, titanium oxide, tin oxide, zinc oxide, tungsten oxide, zirconium oxide, hafnium oxide, strontium oxide, vanadium oxide, niobium oxide, etc. may be exemplified. These may be used alone or in any combination thereof. The dispersion of the oxide semiconductor particles may be obtained by mixing the semiconductor particles and the dispersion medium by a sand mill, beads mill, ball mill, triple roll mill, colloid mill, ultrasonic homogenizer, Henschel mixer, jet mill, or other dispersion mixer. Further, to prevent reagglomeration of particles in the dispersion, acetyl acetone, hydrochloric acid, nitric acid, a surfactant, a chelating agent, etc. may also be added. Further, for the purpose of thickening the dispersion, polyethylene oxide or polyvinyl alcohol or another polymer, a cellulose-based thickening agent, and various other types of thickening agents may be added. As a semiconductor particle dispersion, a commercially available product (titanium dioxide paste SP100, SP200 made by Showa Denko, titanium dioxide particles TI-Nanoxide T made by Solaronics, titania coating paste PECC01 made by Peccell Technologies) may be used. As the method for coating the dispersion of the semiconductor particles on the transparent conducting layer, for example, a known wet type film formation method may be used. The wet type film formation method is not particularly limited. For example, screen printing, injection printing, roll coating, doctor blade coating, spin coating, spray coating, etc. may be exemplified.

Further, it is preferable to coat the dispersion of the oxide semiconductor particles on a transparent conducting layer, then perform heat treatment, chemical treatment, or plasma or ozone treatment for the purpose of improving the electronic contact between particles, improving the bondability with the transparent conducting layer and improving the film strength. The temperature of the heat treatment is preferably 40° C. to 700° C., more preferably 40° C. to 650° C. Further, the treatment time is not particularly limited, but usually is about 10 seconds to 24 hours. As the chemical treatment, chemical plating using a titanium tetrachloride aqueous solution, chemical plating using a carboxylic acid derivative, electrochemical plating using a titanium trichloride aqueous solution, etc. may be exemplified.

Further, the photovoltaic device composed of the oxide semiconductor mesoporous film 3 carrying a photosensitizing dye (or photosensitizer) is a dye-sensitized solar cell. The photosensitizer is not particularly limited so long as it is a dye which has absorption in the visible light region and/or infrared light region. A metal complex, organic dye, etc. may be used. Specifically, a ruthenium complex dye with a bipyridine structure or a terpyridine structure or other ligands, a porphyrin-based dye, a phthalocyanine-based dye, a cyanine-based dye, a merocyanine-based dye, a xanthene-based dye, etc. may be used. The carrying method is not particularly limited, but the dye may be carried by for example dissolving it in water or alcohol and dipping the mesoporous film 3 in the dye solution or coating the dye solution on the mesoporous film.

As a ruthenium complex dye, a commercially available product (Ruthenium 535, Ruthenium 535 bis-TBA made by Solarenix, PECD03 PECD07 made by Peccell Technologies) may be used.

The counter electrode of the photoelectrode 4, that is, the electrode 5, used may be, for example, a metal, a glass or resin substrate having a conducting layer on the surface, etc. As the metal, platinum, gold, silver, copper, aluminum, indium, titanium, and other metals etc. may be used. As the resin substrate, in addition to the transparent resin substrates illustrated for the photoelectrode 4, a nontransparent or poor transparency general resin substrate may also be used. As the conducting layer provided on the surface, platinum, gold, silver, copper, aluminum, indium, titanium, or another metal, ruthenium oxide, antimony- or fluorine-doped tin oxide, aluminum- or potassium-doped zinc oxide, tin-doped indium oxide, or another conductive metal oxide, carbon, etc. may be mentioned. The thickness of the conducting layer is preferably about 0.01 to 10 μm. The method for providing the conducting layer may also be made a conventional method. For example, coating, spattering, vacuum vapor deposition, spray pyrolysis, chemical vapor deposition (CVD), sol gel, etc. may be exemplified.

Further, as the counter electrode 5, an electrode obtained by forming a conductive polymer film on a substrate and a conductive polymer film electrode may also be used. As the conductive polymer, polythiophene, polypyrrole, polyaniline, etc. may be mentioned. The method of forming the conductive polymer film on the substrate may be to use the usual dipping, spin coating, etc. known as the wet type film formation method to form a conductive polymer film on the substrate from a polymer dispersion. As the conductive polymer dispersion, Japanese Patent Application No. 2003-349793, the polyaniline dispersions disclosed in Japanese Patent Application No. 2004-121943 and Japanese Patent Application No. 2004-360103 or the commercially available Baytron P (aqueous polythiophene derivative dispersion made by Bayer), Aquasave (aqueous polyaniline derivative solution made by Mitsubishi Rayon), etc. may be used. Further, when the substrate is a conductive substrate, in addition to the above technique, it is also possible to use electrolytic polymerization to form a conductive polymer film on a substrate. The conductive polymer film electrode used may be self-standing film obtained by peeling off from an electrode a conductive polymer film formed on an electrode by electrolytic polymerization, a self-standing film formed from a conductive polymer dispersion using casting, spray coating, etc.

known as ordinary wet type film formation methods, etc. For the "conductive polymer dispersion" referred to here, a mixture of the state of conductive polymer particles being dispersed in a solvent and the state of a conductive polymer being dissolved in a solvent is for convenience defined as a "conductive polymer dispersion".

The inventors previously made it possible, when producing a polyaniline (A) from aniline or an aniline derivative, to synthesize a conductive polyaniline capable of being stably dispersed in an organic solvent by an oxidative polymerization together with an aniline derivative having a substituent at the 4-position or other molecular weight modifier (D) in the presence of an organic sulfonic acid compound (B) and/or a high molecular weight polymer having a protonic acid group (C). The inventors engaged in further research and succeeded in coating the polyaniline dispersion on a transparent conductive glass substrate composed of an FTO glass (i.e., glass formed on one surface with a fluorine-doped tin oxide transparent conducting layer) substrate, drying it, and thereby laminating a polyaniline (PAn) conducting layer on an FTO glass substrate to fabricate an FTO-PAn electrode. They discovered that a dye-sensitized solar cell having this FTO-PAn electrode as a counter electrode, compared with a cell using only FTO glass as a counter electrode, becomes larger in short-circuit photocurrent and open-circuit photovoltage and higher in energy conversion efficiency.

The polyaniline (A) forming the conductive polyaniline dispersion according to the present invention is usually obtained by an oxidative polymerization of an aniline or its derivative or any mixture thereof. As the aniline derivative, an aniline derivative having, at any position other than the 4-position of aniline, an alkyl group, alkenyl group, alkoxyl group, alkylthio group, aryl group, aryloxy group, alkylaryl group, arylalkyl group, or alkoxyalkyl group, as a substituent, may be illustrated. Preferably, an aniline derivative having a $C_1$ to $C_5$ alkyl group, alkoxyl group, alkoxyalkyl group, preferably a $C_6$ to $C_{10}$ aryl group, as a substituent, may be illustrated.

The oxidizing agent for the oxidative polymerization of aniline is not particularly limited so long as it can polymerize the aniline or its derivative. For example, ammonium persulfate, persulfuric acid, sodium persulfate, potassium persulfate, or other persulfates, hydrogen peroxide, ferric chloride, ferric sulfate, potassium bichromate, potassium permanganate, hydrogen peroxide-ferrous salt and other redox initiators, etc. may be preferably used. These oxidizing agents may be used alone or in any combination thereof. The amounts of these oxidizing agents used are not particularly limited so long as they are enabling oxidative polymerization of the aniline or its derivative, but the amount is preferably 0.01 to 10 moles, more preferably 0.1 to 5 moles, based upon 1 mole of the aniline or its derivative.

In the present invention, at the time of the oxidative polymerization of the aniline or its derivative, a molecular weight modifier and, if necessary, a phase transfer catalyst are made copresent in the presence of a sulfonic acid compound (B) and/or an organic polymer compound having a protonic acid group (C). The polymerization is performed in the mixed layer of the aqueous layer and organic layer.

As the sulfonic acid compound (B) usable in the present invention, any sulfonic acid compound conventionally usable for oxidative polymerization of an aniline may be used. Specifically, it is an aliphatic or aromatic sulfonic acid having one or more sulfonic acid groups and their salts. An alkylsulfonic acid, arylsulfonic acid, alkylarylsulfonic acid, α-olefin sulfonic acid, sulfonic acid of a higher fatty acid ester, (di)alkylsulfosuccinic acid, sulfonic acid of a higher aliphatic amide, camphor sulfonic acid and their salts may be exemplified. The amounts of these sulfonic acids used are not particularly limited, but it is preferable to use 0.01 to 5 moles per mole more preferably 0.1 to 3 moles of aniline or its derivative. At the time of the polymerization, in addition to the sulfonic acid, hydrochloric acid, sulfuric acid, nitric acid, perchloric acid, or other inorganic acids, m-nitrobenzoic acid, trichloroacetic acid, or other organic acids and other protonic acids may be added, if necessary.

The insoluble organic polymer compound (C) having a protonic acid group usable in the present invention has a structure having a plurality of side chains having protonic acid groups and a plurality of side chains exhibiting affinity with an organic solvent bonded to the main chain. The protonic acid groups are not limited to the side chain terminals and may also be present in a plurality of number in the middle (i.e. not the end) of the side chains. As the protonic acid group, a sulfonic acid group, carboxyl group, phosphoric acid group, or sulfuric acid group may be exemplified, preferably a sulfonic acid group, carboxyl group or phosphoric acid group. The insoluble polymer compound having a protonic acid group is not particularly limited so long as this structure is satisfied, but a copolymer of an ethylenically unsaturated monomer having a protonic acid group and an ethylenically unsaturated monomer having a side chain exhibiting affinity with the organic solvent may be exemplified. As an ethylenically unsaturated monomer having a protonic acid group, a styrenesulfonic acid, vinylsulfonic acid, allylsulfonic acid, methacrylic sulfonic acid, 2-methacryloyloxyethyl-1-sulfonic acid, 3-methacryloyloxypropane-1-methyl-1-sulfonic acid, 3-methacryloyloxypropane-1-sulfonic acid, 4-methacryloyloxybutane-1-sulfonic acid, 2-acryliamide-2-methylpropanesulfonic acid, methallyloxybenzene sulfonic acid, methallylsulfonic acid, acrylic acid, methacrylic acid, itaconic acid, maleic acid, fumaric acid, crotonic acid, monobutyl fumarate, monobutyl fumarate, monoethylhexyl maleate, hydroxypropyl maleate, anhydrous maleic acid, anhydrous citraconic acid, ethyl(meth)acrylate phosphate, polyoxyethylene glycol mono(meth)acrylate phosphate, propyleneglycol mono(meth)acrylate phosphate, etc. may be exemplified. Further, the protonic acid group of the ethylene-based unsaturated monomer having a protonic acid group may also be an ammonium group, alkali metal salt or salt of an organic amine group. As an ethylene-based unsaturated monomer having a side chain exhibiting affinity with an organic solvent, styrene, α-methylstyrene, chlorostyrene, 1,3-butadiene, isoprene, 2,3-dimethyl-1,3-butadiene, 1,3-pentadiene, vinyl chloride, vinylidene chloride, (meth)acrylonitrile, a styrene derivative having a $C_1$ to $C_{30}$ heteroatom-includable hydrocarbon group, a (meth)acrylic acid ester derivative, a (meth)acrylamide derivative, a vinyl ether derivative, and a vinyl carboxylic acid ester derivative may be exemplified. The copolymer may be any of a random copolymer, a block copolymer, or a graft copolymer. The polymer may be obtained using a known polymerization method.

As the water-insoluble organic polymer compound having a protonic acid group, a commercially available polymer-based pigment dispersant may be used. As the commercially available product, for example Dispervic-110, Dispervbyk-111, Disperbyk-171, and Disperbyk-174, BYK-P104 (made by BYK Chemie), Solsperse 26000 and Solsperse 32000 (made by Avecia), etc. may be exemplified. The amount of such an organic polymer compound having a protonic acid group used is not particularly limited, but it is preferable to use the organic polymer compound to give a ratio of the protonic acid group to 1 mole of the aniline or its derivative of 0.05 to 20 moles, more preferably 0.1 to 10 moles.

As the molecular weight modifier (D) usable in the present invention, an aniline derivative having a substituent at the 4-position, a thiol compound, a disulfide compound and/or an α-methylstyrene dimer may be mentioned.

As the aniline derivative having a substituent X at the 4-position, the compound of formula (IV):

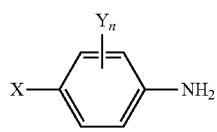

(IV)

may be exemplified. In formula (IV), X indicates an alkyl group, alkenyl group, alkoxyl group, alkylthio group, aryl group, aryloxy group, alkylaryl group, arylalkyl group, alkoxyalkyl group or halogen group, Y indicates a hydrogen atom, alkyl group, alkenyl group, alkoxyl group, alkylthio group, aryl group, aryloxy group, alkylaryl group, arylalkyl group, alkoxyalkyl group or halogen group, n indicates an integer of 0 to 4, and, when n is an integer of 2 to 4, Y may be the same or different. The preferable substituent X is a $C_1$ to $C_5$ alkyl group, alkoxyl group, alkoxyalkyl group or $C_6$ to $C_{10}$ aryl group, while a preferable substituent Y is a hydrogen atom, $C_1$ to $C_5$ alkyl group, alkoxyl group, alkoxyalkyl group or $C_6$ to $C_{10}$ aryl group.

As the thiol compound and/or disulfide compound usable in the present invention, butyl mercaptan, octyl mercaptan, dodecyl mercaptan, hexadecyl mercaptan, tetradecyl mercaptan, 2,2,4,6,6-pentamethylheptane-4-methylenethiol or other thiol compound; diethyl disulfide, dibutyl disulfide or other alkyl disulfide; diphenyl disulfide, dibenzyl disulfide or other aromatic disulfides; dimethyl xanthogen disulfide, diethyl xanthogen disulfide or other xanthogen disulfide; tetramethylthiuram disulfide, tetraethylthiuram disulfide or other thiuram disulfide; or other disulfide compounds may be exemplified. These are known compounds. Most are generally commercially available. The amount of the molecular weight modifier used is not particularly limited, but the use of $5.0 \times 10^{-5}$ to $5.0 \times 10^{-1}$ moles per mole of the aniline or its derivative is preferable, and the use of $2.0 \times 10^{-4}$ to $2.0 \times 10^{-1}$ moles is more preferable.

The phase transfer catalyst usable in the preferred embodiment of the present invention is not particularly limited so long as it is used as a general phase transfer catalyst, but specifically, benzyltriethylammonium chloride, methyltrioctylammonium chloride, tetra-n-butylammonium bromide, tetra-n-butylammonium iodide, tetra-n-butylammonium chloride and other tetraalkylammonium halides; tetrabutylammonium hydrooxide and other tetraalkylammonium hydrooxides; methyltriphenyl-phosphonium bromide and other tetraalkylphosphonium halides; 12-Crown-4, 15-Crown-5, 18-Crown-6 and other Crown ethers; etc. may be exemplified. Among these, from the viewpoint of the ease of removal of the catalyst after the reaction and other handling, tetraalkylammonium halides are preferable. In particular, the industrially inexpensively obtainable tetra-n-butylammonium bromide or tetra-n-butylammonium chloride is preferred. In the present invention, the amount of the phase transfer catalyst used if necessary is not particularly limited, but it may be used in an amount of preferably a 0.0001 moles or more, more preferably 0.005 mole or more, based upon 1 mole of the oxidizing agent, but if using the phase transfer catalyst in excess, the isolation and refinement steps after the end of the reaction become difficult, so when using it, it is preferably used in the range of 5 moles or less, more preferably an equimolar amount or less.

As the method for oxidative polymerization of the aniline or its derivative according to the present invention, it is possible to use a conventional method other than using the reaction ingredient an essential requirement. The other general use additives may be conventional ones so long as the objects of the present invention are not adversely affected. The polymerization medium of the present invention may be composed of the two types of liquid media of water and an organic solvent. The organic solvent usable is not particularly limited so long as it dissolves the aniline or its derivative and is not water-soluble. As specific examples, benzene, toluene, xylene, and other aromatic hydrocarbons; hexane, heptane, octane and other aliphatic hydrocarbons; dichloroethane, chloroform, 1,2-dichloroethane, chlorobenzene, dichlorobenzene, and other halogenated hydrocarbons; diethyl ether, di-n-propyl ether, diisopropyl ether, di-n-butyl ether, tert-butylmethyl ether and other ethers; ethyl acetate, n-propyl acetate, isopropyl acetate, n-butyl butyrate and other esters may be exemplified. Among these aromatic hydrocarbons, aliphatic hydrocarbons and halogenated hydrocarbons are preferable, particularly preferable are the inexpensive and low toxicity toluene and xylene. Two or more types of the organic solvents may be used together. The amount of use of the liquid medium is an amount capable of being stirred. Usually, 1 to 500 weights, preferably 2 to 300 weights, based upon the weight of the aniline or its derivative are used. Here, the amount of the organic solvent used is 0.05 to 30 weights, preferably, 0.1 to 10 weights, based upon the weight of the water.

The reaction temperature is not particularly limited, but is preferably −10 to 80° C. The polyaniline obtained by the oxidative polymerization according to the present invention is extremely high in yield, normally at least 80%. Further, the electrical conductivity is at least $10^{-9}$ Scm$^{-1}$.

The polyaniline stably dispersed in the organic solvent of the present invention can be isolated by the following procedure:

(a) The method of removing the organic solvent from the reaction solution obtained by evaporation etc. to cause the polyaniline to precipitate, then removing the water to isolate the polyaniline, (b) The method of adding water and/or a polar organic solvent to the reaction solution obtained and removing only the aqueous layer from the reaction solution separated into an organic layer and aqueous layer to isolate the polyaniline dispersed in the organic solvent, (c) The method of adding an excess amount of a polar organic solvent to the reaction solution obtained to cause the polyaniline to precipitate, then removing the solvent by filtration or decantation to isolate the polyaniline, Among these, the preferable isolation methods are the methods of (a) and (b), more preferably the method of (b).

Further, the polyaniline dispersion may be prepared by the following procedure, in addition to the method of (b).

(d) The method of dispersing the polyaniline isolated by (a) or (c) in an organic solvent used for oxidative polymerization of the aniline or aniline derivative.

(e) The method of adding the organic solvent used when preparing the dispersion and/or an organic solvent compatible with this organic solvent to the polyaniline dispersion prepared by the method of (b).

When preparing the polyaniline dispersion, a sand mill, beads mill, ball mill, triple roll mill, colloid mill, ultrasonic homogenizer, Henschel mixer, jet mill or other dispersion mixer may be used.

According to the present invention, a dispersion of an organic solvent (E) including the ingredients (A), (B) and/or (C) and (D) may be coated on a conductive substrate by an ordinary method, for example, a known wet type film formation method, so as to form a conductive polyaniline thin film on a substrate having a transparent conducting layer. The wet type film formation method is not particularly limited. For example, screen printing, injection printing, roll coating, doctor blade coating, spin coating, spray coating, etc. may be exemplified. It is possible to use this method to coat the dispersion to a thickness of, for example, 0.01 to 100 μm to obtain a conductive substrate according to the present invention. The concentrations of the ingredients in the dispersion are not particularly limited, but from the viewpoints of the dispersion stability of the polyaniline dispersion and the conductivity and strength of the polyaniline thin film formed from the dispersion, 0.01 to 90 wt % of the polyaniline (A), 0 to 80 wt % of the sulfonic acid compound (B), 0 to 80 wt % of the organic polymer having a protonic acid group (C), and 0.01 to 20 wt % of the aniline derivative having a substituent at the 4-position, thiol compound, disulfide compound or α-methylstyrene dimer (D) are preferable.

As the conductive substrate to be coated with the polyaniline dispersion of the present invention, as in the past, for example, a metal, a glass or resin substrate having a conducting layer on the surface, etc. may be used. As the metal, in addition to platinum, another metal such as gold, silver, copper, aluminum, indium, titanium may be used. As the resin substrate, in addition to the transparent resin substrate illustrated for the photoelectrode 4, a nontransparent or poor transparency general resin substrate may also be used. As the conducting layer provided on the surface, in addition to platinum, another metal such as gold, silver, copper, aluminum, indium, titanium; a conductive metal oxide such as, ruthenium oxide, antimony- or fluorine-doped tin oxide, aluminum- or potassium-doped zinc oxide, tin-doped indium oxide; carbon, etc. may be exemplified. The thickness of the conducting layer is preferably 0.01 to 10 μm or so. The method of provision of the conducting layer may be a conventional method. For example, coating, sputtering, vacuum vapor deposition, spray pyrolysis, chemical vapor deposition (CVD), sol gel method, etc. may be exemplified.

The conductive substrate of the present invention is obtained by coating the illustrated conductive substrate with a polyaniline dispersion, but it is also possible to coat a non-conductive substrate composed of a glass or resin substrate directly with a polyaniline dispersion and use it as a conductive substrate.

In addition, a self-supporting film, etc. formed from the conductive polyaniline dispersion stably dispersed in an organic solvent according to the present invention by, for example, a conventional wet-type film forming method such as a casting method or a spin coating method.

The conductive substrate according to the present invention may be used for a photovoltaic device or dye-sensitized solar cell, instead of a counter electrode having a conventional platinum thin film.

EXAMPLES

Examples I-1 to I-11 and Comparative Examples I-1 to I-3

Preparation of Electrolyte

Layered Clay Mineral

Synthetic smectite made by Co-op Chemical (product name: Lucentite SWN) was used to prepare the Clay Gel Electrolytes 1 and 2

Organically Modified Layered Clay Mineral SPN

Synthetic smectite made by Co-op Chemical (product name: Lucentite SPN) was used to prepare the Clay Gel Electrolytes 3 to 10.

Organically Modified Layered Clay Mineral STN

Synthetic smectite made by Co-op Chemical (product name: Lucentite STN) was used to prepare the Clay Gel Electrolyte 11.

Preparation of Ionic Liquid
1-Methyl-3-Propylimidazolium Iodide

1-Methylimidazole (8.2 g, made by Aldrich) and propyl iodide (16.9 g, made by Kanto Chemical) were stirred in toluene at 75° C. for 15 hours. After the end of the reaction, the reaction solution separated into the two layers of a toluene layer and an ionic liquid layer. By removing the toluene layer from the reaction solution, the ionic liquid was obtained. The ionic liquid obtained was washed with toluene 3 times for purification. The toluene was distilled off in vacuo, whereby an ionic liquid 1-methyl-3-propylimidazolium iodide (23.8 g) was obtained.

Preparation of Ionic Liquid
1-Ethyl-3-Methylimidazolium
Bis(Trifluoromethanesulfonyl)Imide 1-ethyl-3-methylimidazolium iodide (5 g, made by Tokyo Kasei Kogyo) and lithium bis(trifluoromethane-sulfonyl) imide (6 g, made by Kanto Chemical) were stirred in water at room temperature for 5 hours. After the end of the reaction, the reaction solution separated into an aqueous layer and an ionic liquid layer. The aqueous layer was removed from the reaction solution to obtain the ionic liquid. The ionic liquid obtained was purified by washing with water 3 times. The water was distilled off in vacuo, whereby an ionic liquid 1-ethyl-3-methylimidazolium bis(trifluoromethanesulfonyl) imide was obtained in an amount of 7.8 g.

Preparation of 1,2-dimethyl-3-propylimidazolium Iodide 1,2-dimethylimidazole (7.2 g, made by Aldrich) and propyl iodide (12.7 g, made by Kanto Chemical) were stirred in toluene at 75° C. for 15 hours. After the end of the reaction, the reaction mixture was cooled to room temperature and the crude crystals formed were recovered. A mixed solvent of toluene and isopropanol was used for recrystallization. The crystals were dried in vacuo to obtain 1,2-dimethyl-3-propylimidazolium iodide (18.3 g).

Preparation of Clay Gel Electrolyte 1

0.1 mol/liter of lithium iodide (made by Aldrich), 0.15 mol/liter of iodine (made by Kanto Chemical) and 0.5 mol/liter of 4-tert-butylpyridine (made by Aldrich) were dissolved in an ionic liquid 1-methyl-3-propylimidazolium iodide to prepare an electrolyte. The layered clay mineral Lucentite SWN was added in an amount of 7.5 wt % to the electrolyte obtained, followed by mixing by a mortar. The clay-like substance composed of the ionic liquid and layered clay mineral was centrifuged to obtain the Clay Gel Electrolyte 1.

Preparation of Clay Gel Electrolyte 2

600 mg of the layered clay mineral Lucentite SWN swelled and dispersed in water/acetonitrile=2/1 (weight ratio) and 5 ml of an ionic liquid 1-methyl-3-propylimidazolium iodide were mixed to give a weight ratio of layered clay mineral to the ionic liquid of 7.5 wt %. The mixture was stirred at room temperature for 3 hours. The solvent was distilled off in vacuo from the dispersion containing the layered clay mineral and ionic liquid, whereby a clay-like substance was obtained. 5 mol of an acetonitrile solution in which lithium iodide (0.1 mol/liter), iodine (0.15 mol/liter) and 4-tert-butylpyridine (0.5 mol/liter) were dissolved in advance was added to the clay-like substance obtained, then the mixture was stirred at room temperature for 3 hours. After the end of the stirring, the acetonitrile in the dispersion was distilled off in vacuo, whereby the Clay Gel Electrolyte 2 was obtained.

Preparation of Clay Gel Electrolyte 3

0.1 mol/liter of lithium iodide, 0.15 mol/liter of iodine and 0.5 mol/liter of 4-tert-butylpyridine were dissolved in an ionic liquid 1-methyl-3-propylimidazolium iodide to prepare an electrolyte. The organically modified layered clay mineral Lucentite SPN was added to the electrolyte obtained in an amount of 7.5 wt %, followed by mixing by a mortar. The clay-like substance composed of the ionic liquid and organically modified layered clay mineral was centrifuged to obtain the Clay Gel Electrolyte 3.

Preparation of Clay Gel Electrolyte 4

0.1 mol/liter of lithium iodide, 0.15 mol/liter of iodine and 0.5 mol/liter of 4-tert-butylpyridine were dissolved in an ionic liquid 1-methyl-3-propylimidazolium iodide to prepare an electrolyte. The organically modified layered clay mineral Lucentite SPN was added to this electrolyte in an amount of 7.5 wt %, followed by mixing by a mortar to obtain a clay-like substance Clay Gel Electrolyte 4 composed of an ionic liquid and organically modified layered clay mineral.

Preparation of Clay Gel Electrolyte 5

0.1 mol/liter of lithium iodide, 0.15 mol/liter of iodine and 0.5 mol/liter of 4-tert-butylpyridine were dissolved in an ionic liquid 1-methyl-3-propylimidazolium iodide to prepare an electrolyte. This electrolyte was added to the organically modified layered clay mineral Lucentite SPN dispersion swelled and dispersed in acetonitrile in advance (ratio of mixture of weight ratio of SNP per ionic liquid of 7.5 wt %), then the mixture was stirred at room temperature for 3 hours. After the stirring, the acetonitrile was distilled off in vacuo, whereby the clay-like substance Clay Gel Electrolyte 5 was obtained.

Preparation of Clay Gel Electrolyte 6

5 ml of an ionic liquid 1-methyl-3-propylimidazolium iodide was added to 600 mg of the layered clay mineral Lucentite SPN swelled and dispersed in toluene in advance while stirring and the mixture was stirred at room temperature for 3 hours (ratio of mixture of weight ratio of SPN to the ionic liquid of 7.5 wt %). After stirring, the mixture was allowed to stand, whereby the dispersion was separated into a layer composed of the organically modified layered clay mineral and ionic liquid and a toluene layer. The toluene layer of the dispersion was removed, whereby a layer of an organically modified layered clay mineral and ionic liquid was obtained. The complex of the organically modified layered clay mineral and ionic liquid obtained was washed with toluene 3 times, then the toluene was distilled off in vacuo, whereby a clay-like substance was obtained. 5 ml of an acetonitrile solution in which lithium iodide (0.1 mol/liter), iodine (0.15 mol/liter) and 4-tert-butylpyridine (0.5 mol/liter) were dissolved in advance was added to the clay-like substance obtained, then the mixture was stirred at room temperature for 3 hours. After the stirring, the acetonitrile in the dispersion was distilled off in vacuo, whereby the Clay Gel Electrolyte 6 was obtained.

Preparation of Clay Gel Electrolyte 7

0.1 mol/liter lithium iodide, 0.15 mol/liter iodine and 0.5 mol/liter 4-tert-butylpyridine were dissolved in an ionic liquid 1-ethyl-3-methylimidazolium bis(trifluoromethanesulfonyl)imide to prepare an electrolyte. An organically modified layered clay mineral Lucentite SPN was added to the obtained electrolyte in an amount of 7.5 wt %, then mixed by a mortar. The clay-like substance comprised of the ionic liquid and organically modified layered clay mineral was centrifuged to obtain the Clay Gel Electrolyte 7.

Preparation of Clay Gel Electrolyte 8

0.1 mol/liter of lithium iodide, 0.15 mol/liter of iodine, and 0.5 mol/liter of 4-tert-butylpyridine were dissolved in an ionic liquid 1-ethyl-3-methylimidazolium bis(trifluoromethanesulfonyl)imide to prepare an electrolyte. An organically modified layered clay mineral Lucentite SPN was added to this electrolyte in an amount of 7.5 wt %, followed by mixing by a mortar to obtain a clay-like substance Clay Gel Electrolyte 8 composed of an ionic liquid and organically modified layered clay mineral.

Preparation of Clay Gel Electrolyte 9

0.1 mol/liter of lithium iodide, 0.15 mol/liter of iodine and 0.5 mol/liter of 4-tert-butylpyridine were dissolved in an ionic liquid 1-ethyl-3-methylimidazolium bis(trifluoromethanesulfonyl)imide to prepare an electrolyte. This electrolyte was added to an organically modified layered clay mineral Lucentite SPN dispersion swelled and dispersed in acetonitrile in advance (ratio of mixture of weight ratio of SPN to ionic liquid of 7.5 wt %), then the mixture was stirred at room temperature for 3 hours. After the end of the stirring, the acetonitrile was distilled off in vacuo, whereby a clay-like substance Clay Gel Electrolyte 9 was obtained.

Preparation of Clay Gel Electrolyte 10

5 ml of an ionic liquid 1-ethyl-3-methylimidazolium bis(trifluoromethanesulfonyl)imide was added to 570 mg of the layered clay mineral Lucentite SPN swelled and dispersed in toluene in advance while stirring, then the mixture was stirred at room temperature for 3 hours (ratio of mixture of weight ratio of SPN to ionic liquid of 7.5 wt %). After stirring, the mixture was allowed to stand, whereupon the dispersion separated into a layer composed of the organically modified layered clay mineral and ionic liquid and a toluene layer. The toluene layer of the dispersion was removed, whereby a layer composed of the organically modified layered clay mineral and ionic liquid was obtained. The complex obtained composed of the organically modified layered clay mineral and ionic liquid was washed with toluene 3 times, then the toluene was distilled off in vacuo, whereby a clay-like substance was obtained. 5 ml of an acetonitrile solution in which lithium iodide (0.1 mol/liter), iodine (0.15 mol/liter) and 4-tert-butylpyridine (0.5 mol/liter) were dissolved in advance was added to the clay-like substance obtained, then the mixture was stirred at room temperature for 3 hours. After the stirring, the acetonitrile in the dispersion was distilled off in vacuo, whereby the Clay Gel Electrolyte 10 was obtained.

Preparation of Clay Gel Electrolyte 11

0.1 mol/liter of lithium iodide, 0.15 mol/liter of iodine and 0.5 mol/liter of 4-tert-butylpyridine were dissolved in an ionic liquid 1-ethyl-3-methylimidazolium bis(trifluoromethanesulfonyl)imide to prepare an electrolyte. This electrolyte was added to an organically modified layered clay mineral Lucentite STN swelled and dispersed in acetonitrile in advance (ratio of mixture of weight ratio of SPN per ionic liquid of 7.5 wt %) and stirred at room temperature for 3 hours. After the end of stirring, the acetonitrile was distilled off in vacuo, whereby a clay-like substance Clay Gel Electrolyte 11 was obtained.

Preparation of Ionic Liquid Electrolyte 12

0.1 mol/liter of lithium iodide, 0.15 mol/liter of iodine, and 0.5 mol/liter of 4-tert-butylpyridine were dissolved in an ionic liquid 1-methyl-3-propylimidazolium iodide to prepare the Ionic Liquid Electrolyte 12.

Preparation of Ionic Liquid Electrolyte 13

0.1 mol/liter of lithium iodide, 0.15 mol/liter of iodine and 0.5 mol/liter of 4-tert-butylpyridine were dissolved in an ionic liquid 1-ethyl-3-methylimidazolium bis(trifluoromethanesulfonyl)imide to prepare the Ionic Liquid Electrolyte 12.

Preparation of Organic Solvent Electrolyte 14

0.3 mol/liter of 1,2-dimethyl-3-propylimidazolium iodide, 0.1 mol/liter of lithium iodide, 0.05 mol/liter of iodine and 0.5 mol/liter of 4-tert-butylpyridine were dissolved in 3-methoxypropylnitrile to prepare the Organic Solvent Electrolyte 14.

Fabrication of Cell

Fabrication of Photoelectrode

A transparent conductive glass substrate (made by Nippon Sheet Glass, conducting layer made of fluorine-doped tin oxide, sheet resistance 8Ω/□) was coated on its surface with a paste prepared by mixing titanium dioxide powder (AEROXIDE $TiO_2$ P25, average particle size 25 nm, made by Nippon Aerosil), acetyl acetone, distilled water and a surfactant (Triton X100, made by Acros Organics) by a mortar, dried, then sintered at 460° C. for 45 minutes, whereby the transparent conductive glass substrate was formed with a mesoporous titanium oxide thin film. The glass substrate having this mesoporous titanium oxide thin film was dipped in an ethanol solution (concentration of $3 \times 10^{-4}$ mol/liter) of ruthenium complex dye (i.e., cis-di(thiocyanate-N,N'-bis(2, 2'-bipyridyl-4,4'-dicarboxylic acid) ruthenium (II) complex, Ruthenium 535, made by Solaronix) for 12 hours. The result was washed with acetonitrile, then dried in a dark location in a flow of nitrogen to impregnate the mesoporous titanium oxide thin film with a sensitizing dye. This was used as a photoelectrode.

Fabrication of Platinum Counter Electrode

A transparent glass substrate (made by Nippon Sheet Glass, conductive surface made of fluorine-doped tin oxide, sheet resistance 8Ω/□) was formed on its surface with an approximately 100 nm platinum thin film by spattering. This electrode was used as a counter electrode.

Example I-1

The fabricated photoelectrode was coated with the Clay Gel Electrolyte 1, was superposed on the platinum counter electrode, then was fastened by clips to obtain the cell of Example I-1 (using the Clay Gel Electrolyte 1).

Example I-2

A cell was prepared in the same way as in Example I-1, except for using the Clay Gel Electrolyte 2 instead of the Clay Gel Electrolyte 1.

Example I-3

A cell was prepared in the same way as in Example I-1, except for using the Clay Gel Electrolyte 3 instead of the Clay Gel Electrolyte 1.

Example I-4

A cell was prepared in the same way as in Example I-1, except for using the Clay Gel Electrolyte 4 instead of the Clay Gel Electrolyte 1.

Example I-5

A cell was prepared in the same way as in Example I-1, except for using the Clay Gel Electrolyte 5 instead of the Clay Gel Electrolyte 1.

Example I-6

A cell was prepared in the same way as in Example I-1, except for using the Clay Gel Electrolyte 6 instead of the Clay Gel Electrolyte 1.

Example I-7

A cell was prepared in the same way as in Example I-1, except for using the Clay Gel Electrolyte 7 instead of the Clay Gel Electrolyte 1.

Example I-8

A cell was prepared in the same way as in Example I-1, except for using the Clay Gel Electrolyte 8 instead of the Clay Gel Electrolyte 1.

Example I-9

A cell was prepared in the same way as in Example I-1, except for using the Clay Gel Electrolyte 9 instead of the Clay Gel Electrolyte 1.

Example I-10

A cell was prepared in the same way as in Example I-1, except for using the Clay Gel Electrolyte 10 instead of the Clay Gel Electrolyte 1.

Example I-11

A cell was prepared in the same way as in Example I-1, except for using the Clay Gel Electrolyte 11 instead of the Clay Gel Electrolyte 1.

Comparative Example I-1

The fabricated photoelectrode was coated with the Ionic Liquid Electrolyte 12, was superposed with the platinum counter electrode, then was fastened by clips to obtain the cell of Comparative Example I-1.

Comparative Example I-2

A cell was prepared in the same way as in Comparative Example I-1, except for using the Ionic Liquid Electrolyte 12 instead of the Ionic Liquid Electrolyte 11.

Comparative Example I-3

The fabricated photoelectrode and counter electrode were superposed and fastened by clips at two locations. An organic solvent electrolyte 13 was filled in the clearance between the two electrodes to fabricate the cell of Comparative Example I-3.

Evaluation of Cells

The cells of Examples I-1 to I-11 and Comparative Example I-1 to Comparative Example I-3, as shown in FIG. 2, were irradiated from the photoelectrode side with AM1.5 pseudo sunlight at a light intensity of 100 mW/cm$^2$ using a solar simulator as a light source. A current/voltage measurement apparatus (Digital SourceMeter 2400 made by Keithly Instruments) was used to find the short-circuit photocurrent, open-circuit photovoltage, fill factor, and conversion efficiency. The results of the cells are shown in Table I-1. Further, the cells of Example I-2, Example I-5, Example I-9, and Comparative Example I-1 to Comparative Example I-3 were allowed to stand for 1 week after fabrication (at room temperature in a dark location), then were measured for cell current-voltage characteristics. The initial values and results of measurement after standing for 1 week of the cells are shown in Table I-2.

TABLE I-1

| | | Current-voltage characteristic | | | |
|---|---|---|---|---|---|
| | Electrolyte | Short-circuit photocurrent density (mA/cm$^2$) | Open-circuit photovoltage (mV) | Fill factor | Conversion efficiency (%) |
| Ex. I-1 | Clay Gel Electrolyte 1 | 7.9 | 682 | 0.62 | 3.3 |
| Ex. I-2 | Clay Gel Electrolyte 2 | 8.1 | 684 | 0.63 | 3.5 |
| Ex. I-3 | Clay Gel Electrolyte 3 | 8.5 | 687 | 0.63 | 3.7 |
| Ex. I-4 | Clay Gel Electrolyte 4 | 8.6 | 686 | 0.64 | 3.8 |
| Ex. I-5 | Clay Gel Electrolyte 5 | 9.5 | 694 | 0.64 | 4.2 |
| Ex. I-6 | Clay Gel Electrolyte 6 | 9.7 | 697 | 0.65 | 4.4 |
| Ex. I-7 | Clay Gel Electrolyte 7 | 11.1 | 643 | 0.63 | 4.5 |
| Ex. I-8 | Clay Gel Electrolyte 8 | 11.1 | 645 | 0.64 | 4.6 |
| Ex. I-9 | Clay Gel Electrolyte 9 | 11.8 | 662 | 0.63 | 4.9 |
| Ex. I-10 | Clay Gel Electrolyte 10 | 11.9 | 664 | 0.64 | 5.0 |
| Ex. I-11 | Clay Gel Electrolyte 11 | 11.9 | 665 | 0.64 | 5.1 |
| Comp. Ex. I-1 | Ionic Liquid Electrolyte 12 | 7.8 | 681 | 0.62 | 3.3 |
| Comp. Ex. I-2 | Ionic Liquid Electrolyte 13 | 10.1 | 632 | 0.61 | 3.9 |
| Comp. Ex. I-3 | Organic Solvent Electrolyte 14 | 14.1 | 723 | 0.66 | 6.7 |

TABLE I-2

| | | Time of fabrication of cell (initial value) | | | | After standing 1 week after fabrication of cell | | | |
|---|---|---|---|---|---|---|---|---|---|
| | Electrolyte | Short-circuit photocurrent density (mA/cm$^2$) | Open-circuit photovoltage (mV) | Fill factor | Conversion efficiency (%) | Short-circuit photocurrent density (mA/cm$^2$) | Open-circuit photovoltage (mV) | Fill factor | Conversion efficiency (%) |
| Ex. I-2 | Clay Gel Electrolyte 2 | 8.1 | 684 | 0.63 | 3.5 | 8.1 | 682 | 0.62 | 3.4 |
| Ex. I-5 | Clay Gel Electrolyte 5 | 9.5 | 694 | 0.64 | 4.2 | 9.3 | 692 | 0.64 | 4.2 |
| Ex. I-9 | Clay Gel Electrolyte 9 | 11.8 | 662 | 0.63 | 4.9 | 11.7 | 663 | 0.63 | 4.9 |
| Comp. Ex. I-1 | Ionic Liquid Electrolyte 12 | 7.8 | 681 | 0.62 | 3.3 | 7.6 | 678 | 0.61 | 3.1 |
| Comp. Ex. I-2 | Ionic Liquid Electrolyte 13 | 10.1 | 632 | 0.61 | 3.9 | 9.8 | 630 | 0.60 | 3.7 |
| Comp. Ex. I-3 | Organic Solvent Electrolyte 14 | 14.1 | 723 | 0.66 | 6.7 | 0.01 | 321 | ? | 0 |

The cell of Example I-1 using the Electrolyte 1 prepared by mixing the layered clay mineral and ionic liquid electrolyte was compared with the cell of Comparative Example I-1 using the Ionic Liquid Electrolyte 12, whereby it was learned that the short-circuit photocurrent density, open-circuit photovoltage, fill factor and conversion efficiency were all of the same extent. Further, the cells of Examples I-3, I-4, I-7, and I-8 using the Electrolytes 3, 4, 7 and 8 prepared by mixing the organically modified layered clay mineral and ionic liquid electrolyte were compared with the cells of Comparative Examples I-1 and I-2 using the Ionic Liquid Electrolytes 12 and 13, whereby it was learned that they were all equal, or better, in short-circuit photocurrent density, open-circuit photovoltage, fill factor and conversion efficiency. Further, the cells of Examples I-2, I-5, I-6, and I-9 to I-11 using the Electrolyte 2, Electrolyte 5, Electrolyte 6 and Electrolytes 9 to 11 prepared using a swelled dispersion of the layered clay mineral or organically modified layered clay mineral and ionic liquid electrolyte were compared with the cells of Comparative Examples I-1 and I-2 using the Ionic Liquid Electrolytes 12 and 13, whereby it was learned that they were all improved in short-circuit photocurrent density, open-circuit photovoltage, fill factor and conversion efficiency.

Further, the cells of Example I-2, Example I-5, Example I-9 and Comparative Examples I-1 to I-3 were allowed to stand at room temperature in a dark location for 1 week, then were measured for short-circuit photocurrent density, open-circuit photovoltage, fill factor and conversion efficiency and compared with values right after cell production (initial values).

The cells of Example I-2, Example I-5 and Example I-9 were free of leakage of electrolyte from the clearance of bonding with the glass electrode even 1 week after cell fabrication and maintained initial values of short-circuit photocurrent density, open-circuit photovoltage, fill factor and conversion efficiency. On the other hand, the cells of Comparative Examples I-1 and I-2 were observed to have leakage of some of the electrolyte from the clearance of bonding with the glass electrode after being allowed to stand for 1 week. The cell of Comparative Example I-3 using the organic solvent electrolyte (Electrolyte 14) was larger at the time of fabrication of the cell than the cells using Electrolyte 2, Electrolyte 5, Electrolyte 9, Electrolyte 12, and Electrolyte 13 (Example I-2, Example I-5, Example I-9, Comparative Example I-1 and Comparative Example I-2) in short-circuit photocurrent density, open-circuit photovoltage, fill factor and conversion efficiency, but ended up with the electrolyte evaporating and no longer able to generate power 1 week after cell fabrication.

From the above results, a clay gel electrolyte prepared from a layered clay mineral or organically modified layered clay mineral and an ionic liquid electrolyte of the present invention provides a dye-sensitized solar cell with a large short-circuit photocurrent density, open-circuit photovoltage, fill factor and conversion efficiency at the time of irradiation of light, free of leakage from between electrodes, and superior in stability. In particular, a clay gel electrolyte prepared from a swelled dispersion of a layered clay mineral and organically modified layered clay mineral and an ionic liquid electrolyte is improved over an ionic liquid electrolyte in short-circuit photocurrent density, open-circuit photovoltage, fill factor, and conversion efficiency.

Standard Examples II-1 to II-2 and Examples II-1 to II-4 and Comparative Examples II-1 to II-6

Preparation of Polyaniline Toluene Dispersions

Preparation of Polyaniline Toluene Dispersions 1 to 7
Preparation of Polyaniline Toluene Dispersion 1

As shown in Table II-1, 2 g of aniline, 4.2 g of dodecylbenzene sulfonic acid, 1.0 g of polyacryl acid derivative (Solsperse 26000, made by Avecia) and 0.03 g of 4-methylaniline were dissolved in 100 g of toluene, then 50 g of distilled water, in which 3.58 ml of 6N hydrochloric acid was dissolved, was added. 180 mg of tetrabutylammonium bromide was added to this mixed solution, the mixture was cooled to 5° C. or less, then 30 g of distilled water, in which 5.4 g of ammonium persulfate was dissolved, was added. Oxidative polymerization was performed in the state of 5° C. or less for 5 hours, then 50 g of toluene, then a methanol-water mixture (water/methanol=2/3 (weight ratio)) were added and the mixture was stirred. After the end of the stirring, the mixture was separated into an organic (toluene) layer and an aqueous layer. Only the aqueous layer in the reaction solution was removed, whereby a polyaniline toluene dispersion was obtained. Part of the polyaniline toluene dispersion 1 was sampled and the toluene distilled off in vacuo, whereby it was learned that the dispersion contained solids in an amount of 4.1 wt % (polyaniline content 1.3 wt %). Further, this dispersion was filtered by a filter having pore size of 1.0 μm, whereupon there was no clogging. This dispersion was stable with no coagulation and precipitation even after the elapse of 1 year at room temperature. From elemental analysis, the molar ratio of decylbenzene sulfonic acid per aniline monomer unit was 0.45 and the yield of the polyaniline obtained was 96%. Further, the toluene was distilled off in vacuo from the dispersion, a compression shaping machine was used to form the result into pellets and the mixture was measured by the four-probe method at room temperature, whereupon the electrical conductivity was 0.26 $Scm^{-1}$.

Preparation of Polyaniline Toluene Dispersion 2

A polyaniline toluene dispersion 2 was obtained by the same method as the toluene despersion 1, except for using 0.05 g of a dodecanethiol as a molecular weight modifier, instead of 4-methylaniline. Part of the polyaniline toluene dispersion was sampled and the toluene distilled off in vacuo, whereby it was learned that the dispersion contained solids in an amount of 4.1 wt % (polyaniline content 1.3 wt %). Further, this dispersion was filtered by a filter having a pore size of 1.0 μm, whereupon there was no clogging. This dispersion was stable with no coagulation and precipitation even after the elapse of 1 year at room temperature. From elemental analysis, the molar ratio of the dodecylbenzene sulfonic acid per aniline monomer unit was 0.45 and the yield of the polyaniline was 95%. Further, the toluene was distilled off in vacuo from the dispersion, a compression molding machine was used to form the resultant product into pellets and the pellets were measured by the four-probe method at room temperature, whereupon the electrical conductivity was 0.25 $Scm^{-1}$.

Preparation of Polyaniline Toluene Dispersion 3

A polyaniline toluene dispersion 3 was obtained by the same method as the polyaniline toluene dispersion 1, except for using an α-methylstyrene dimer in an amount of 0.05 g as a molecular weight modifier instead of 4-methylaniline. Part of the polyaniline toluene dispersion was sampled and the toluene distilled off in vacuo, whereby it was learned that the dispersion contained solids in an amount of 4.1 wt % (aniline content 1.3 wt %). Further, this dispersion was filtered by a filter having a pore size of 1.0 μm, whereupon there was no clogging. The dispersion was stable with no coagulation and precipitation even after the elapse of 1 year at room temperature. From the elemental analysis, the molar ratio of the dodecylbenzene sulfonic acid per aniline monomer unit was 0.45 and the yield of the polyaniline was 96%. Further, the toluene was distilled off from the dispersion in vacuo, a compression molding machine was used to form the product into pellets, and the pellets were measured by the four-terminal method at room temperature, whereupon the electrical conductivity was 0.25 $Scm^{-1}$.

Preparation of Polyaniline Toluene Dispersion 4

A polyaniline toluene dispersion 4 was obtained by the same method as the polyaniline toluene dispersion 1, except for not using a polyacryl acid derivative. Part of the polyaniline toluene dispersion was sampled and the toluene distilled off in vacuo, whereupon the dispersion contained solids in an amount of 3.4 wt % (polyaniline content 1.3 wt %). Further, this dispersion was filtered by a filter having a pore size of 1.0 μm, whereupon there was no clogging. This dispersion was stable with no coagulation and precipitation even after the elapse of 1 year at room temperature. From the elemental analysis, the molar ratio of the dodecylbenzene sulfonic acid per aniline monomer unit was 0.45 and the yield of the polyaniline was 96%. Further, the toluene was distilled off in vacuo from the dispersion, a compression molding machine was used to form the product into pellets and the pellets was measured by the four-probe method at room temperature, whereupon the electrical conductivity was 0.25 $Scm^{-1}$.

Preparation of Polyaniline Toluene Dispersion 5

A polyaniline toluene dispersion 5 was obtained by the same method as the polyaniline toluene dispersion 1, without using dodecylbenzene sulfonic acid. Part of the polyaniline toluene dispersion was sampled and the toluene distilled off in vacuo, whereby it was learned that the dispersion contained solids in an amount of 2.0 wt % (polyaniline content 1.3 wt %). Further, this dispersion was filtered by a filter having a pore size of 1.0 μm, whereupon there was no clogging. This dispersion was stable with no coagulation and precipitation even after the elapse of 1 year at room temperature. The polyaniline yield was 96%. Further, the toluene was distilled off in vacuo from the dispersion, a compression molding machine was used to form the product into pellets, and the pellets were measured by the four-probe method at room temperature, whereupon the electrical conductivity was 0.21 $Scm^{-1}$.

Preparation of Polyaniline Toluene Dispersion 6

A polyaniline toluene dispersion 6 was obtained by the same method as the polyaniline toluene dispersion 1, without using tetrabutylammonium bromide. Part of the polyaniline toluene dispersion was sampled and the toluene distilled off in vacuo, whereby it was learned that the dispersion contained solids in an amount of s 2.7 wt % (polyaniline content 0.8 wt %). Further, this dispersion was filtered by a filter having a pore size of 1.0 μm, whereupon there was no clogging. This dispersion was stable with no coagulation and precipitation even after the elapse of 1 year at room temperature. From the elemental analysis, the molar ratio of the dodecylbenzene sulfonic acid per aniline monomer unit was 0.45, and the yield of polyaniline was 60%. Further, the toluene was distilled off in vacuo from the dispersion, a compression molding machine was used to form the product into pellets, and the pellet was measured by the four-probe method at room temperature, whereupon the electrical conductivity was 0.25 $Scm^{-1}$.

Preparation of Polyaniline Toluene Dispersion 7

A polyaniline toluene dispersion 7 was obtained by the same method as the polyaniline toluene dispersion 1, without using 4-methylaniline and tetrabutylammonium bromide. Part of the polyaniline toluene dispersion was sampled and the toluene distilled off in vacuo, whereby it was learned that the dispersion contained solids in an amount of 2.7 wt % (polyaniline content 0.7 wt %). Further, this dispersion was filtered by a filter having a pore size of 1.0 μm, whereupon the filter clogged. This dispersion was allowed to stand at room temperature for 1 year, whereupon a precipitate of the polyaniline was formed. From the elemental analysis, the molar ratio of the dodecylbenzene sulfonic acid per aniline monomer unit was 0.45 and the yield of polyaniline was 55%. Further, the toluene was distilled off in vacuo from the dispersion, a compression molding machine was used to form the product into pellets and the pellet was measured by the four-probe method at room temperature, whereupon the electrical conductivity was 0.20 $Scm^{-1}$.

As shown in Table II-1, the Polyanilines 1 to 5 of the present invention were conductive and equal to, or better than, the Polyaniline 8 of the Comparative Example, but were superior in yield, dispersion in toluene, and dispersion stability. Note that the Polyaniline 6 was not necessarily good in yield, but was superior in dispersability and dispersion stability with respect to toluene.

TABLE II-1

| | Poly-aniline 1 | Poly-aniline 2 | Poly-aniline 3 | Poly-aniline 4 | Poly-aniline 5 | Poly-aniline 6 | Poly-aniline 7 |
|---|---|---|---|---|---|---|---|
| Aniline | 2.0 | 2.0 | 2.0 | 2.0 | 2.0 | 2.0 | 2.0 |
| Dodecylbenzene sulfonic acid | 4.2 | 4.2 | 4.2 | 4.2 | — | 4.2 | 4.2 |
| Polyacrylic acid derivative | 1.0 | 1.0 | 1.0 | — | 1.0 | 1.0 | 1.0 |
| 4-methylaniline*[1] | 0.03 | — | — | 0.03 | 0.03 | 0.03 | — |
| Dodecane thiol*[1] | — | 0.05 | — | — | — | — | — |
| α-methylstyrene dimer*[1] | 0 | — | 0.05 | — | — | — | — |
| Tetrabutyl ammonium bromide*[2] | 0.18 | 0.18 | 0.18 | 0.18 | 0.18 | — | — |
| Yield (%) | 96 | 95 | 96 | 96 | 96 | 60 | 55 |
| Dispersability (wt %)*[3] | 4.1 (1.3) | 4.1 (1.3) | 4.1 (1.3) | 3.4 (1.3) | 2.0 (1.3) | 2.7 (0.8) | 2.7 (0.7) |

TABLE II-1-continued

|  | Poly-aniline 1 | Poly-aniline 2 | Poly-aniline 3 | Poly-aniline 4 | Poly-aniline 5 | Poly-aniline 6 | Poly-aniline 7 |
|---|---|---|---|---|---|---|---|
| Dispersion stability*[4] | G | G | G | G | G | G | P |
| Conductivity (Scm$^{-1}$)*[5] | 0.26 | 0.25 | 0.25 | 0.25 | 0.21 | 0.25 | 0.20 |

*[1]Molecular weight modifier
*[2]Phase transfer catalyst
*[3]Shown by solid concentration in polyaniline toluene dispersion (wt %) (figures in parentheses indicate polyaniline content (wt %)).
*[4]Polyaniline toluene dispersion allowed to stand at room temperature for 3 months, then forming precipitate evaluated as "P" (poor), while not forming it evaluated as "G" (good).
*[5]Pellets made by compression shaping machine measured by 4-terminal method.

Fabrication of Cells

Preparation of Polyaniline Conductive Substrate 1

The Polyaniline Toluene Dispersion 1 prepared above was coated on the surface of a transparent conductive glass substrate (made by Nippon Sheet Glass, conducting layer made of fluorine-doped tin oxide, sheet resistance 8Ω/☐), followed by drying in vacuo to prepare the Polyaniline Conductive Substrate 1. The thickness of the polyaniline thin film on the glass substrate was made the same extent as the thickness of the platinum thin film on the platinum counter electrode.

Preparation of Polyaniline Conductive Substrate 2

A Polyaniline Conductive Substrate 2 was prepared in the same manner as the Polyaniline Conductive Substrate 1, except for using the Polyaniline Toluene Dispersion 4 instead of the Polyaniline Toluene Dispersion 1.

Preparation of Polyaniline Conductive Substrate 3

An aniline was electrochemical polymerized to form a polyaniline thin film on the surface of a transparent conductive glass substrate (made by Nippon Sheet Glass, conducting layer made of fluorine-doped tin oxide, sheet resistance 8Ω/☐). This was dissolved in 1.0 mol/liter of an aqueous hydrochloric acid solution to give a concentration of aniline of 0.5 mol/liter. A transparent conductive glass substrate (made by Nippon Sheet Glass, conducting layer made of fluorine-doped tin oxide, sheet resistance 8Ω/☐) was dipped in the polymerization solution obtained and the aniline was electrolytically polymerized at 0.5 mA over 2 hours. The glass electrode formed having the polyaniline thin film was dipped in a 0.1 mol/liter aqueous hydrochloric acid solution for 10 minutes, as a washing operation, which was repeated 3 times, followed by drying, to thereby prepare the Polyaniline Conductive Substrate 3.

Preparation of Poly(3,4-ethylenedioxythiophene) Conductive Substrate

An aqueous poly(3,4-ethylenedioxythiophene) dispersion (solid 1.3 wt %, Baytron P made by Bayer) was coated on the surface of a transparent conductive glass substrate (made by Nippon Sheet Glass, conducting layer made of fluorine-doped tin oxide, sheet resistance 8Ω/☐), followed by drying in vacuo to thereby prepare a poly(3,4-ethylenedioxythiophene) conductive substrate. The thickness of the poly(3,4-ethylenedioxythiophene) thin film on the glass substrate was made the same extent as the thickness of the platinum thin film on a platinum counter electrode.

Preparation of Poly(anilinesulfonic acid) Conductive Substrate

An aqueous poly(anilinesulfonic acid) solution (solid 5 wt %, made by Aldrich) was coated on the surface of a transparent conductive glass substrate (made by Nippon Sheet Glass, conducting layer made of fluorine-doped tin oxide, sheet resistance 8Ω/☐), followed by drying to thereby prepare a sulfonated polyaniline conductive substrate. The thickness of the sulfonated polyaniline thin film on the glass substrate was made the same extent as the thickness of the platinum thin film on a platinum counter electrode.

Standard Example II-1

The photoelectrode was coated with the Clay Gel Electrolyte 5 prepared above, was then superposed with the platinum counter electrode, and was fastened by clips to prepare the cell of Standard Example II-1.

Standard Example II-2

A cell of Standard Example II-2 was prepared in the same manner as in Standard Example II-1, except for using the Clay Gel Electrolyte 9, instead of the Clay Gel Electrolyte 5.

Example II-1

A cell of Example II-1 was prepared in the same manner as in Standard Example II-1, except for using the Polyaniline Conductive Substrate 1, instead of a platinum counter electrode.

Example II-2

A cell of Example II-2 was prepared in the same manner as in Standard Example II-2, except for using the Polyaniline Conductive Substrate 1, instead of a platinum counter electrode.

Example II-3

A cell of Example II-3 was prepared in the same manner as in Standard Example II-1, except for using the Polyaniline Conductive Substrate 2, instead of a platinum counter electrode.

Example II-4

A cell of Example II-4 was prepared in the same manner as in Standard Example II-2, except for using the Polyaniline Conductive Substrate 2, instead of a platinum counter electrode.

Comparative Example II-1

A cell of Comparative Example II-1 was prepared in the same manner as in Standard Example II-1, except for using the Polyaniline Conductive Substrate 3, instead of a platinum counter electrode.

Comparative Example II-2

A cell of Comparative Example II-1 was prepared in the same manner as in Standard Example II-2, except for using the Polyaniline Conductive Substrate 3, instead of a platinum counter electrode.

Comparative Example II-3

A cell of Comparative Example II-3 was prepared in the same manner as in Standard Example II-1, except for using a poly(3,4-ethylenedioxythiophene) conductive substrate, instead of a platinum counter electrode.

Comparative Example II-4

A cell of Comparative Example II-4 was prepared in the same manner as in Standard Example II-2, except for using a poly(3,4-ethylenedioxythiophene) conductive substrate, instead of a platinum counter electrode.

Comparative Example II-5

A cell of Comparative Example II-5 was prepared in the same manner as in Standard Example II-1, except for using a poly(anilinesulfonic acid) conductive substrate, instead of a platinum counter electrode.

Comparative Example II-6

A cell of Comparative Example II-6 was prepared in the same manner as in Standard Example II-2, except for using a poly(anilinesulfonic acid) conductive substrate, instead of a platinum counter electrode.

Evaluation of Cells

The cells of Standard Examples II-1 and II-2, Example II-1 to II-4 and Comparative Example II-1 to Comparative Example II-6, as shown in FIG. 2, were irradiated with pseudo sunlight of AM 1.5 using a solar simulator as a light source by a light intensity of 100 mW/cm$^2$ from the photoelectrode side and measured for short-circuit photocurrent, open-circuit photovoltage, fill factor, and conversion efficiency using a current/voltage measurement apparatus (Digital Source Meter 2400 made by Keithly Instruments). The results of the cells are shown in Table III-1. Further, the cells of Standard Example II-1, Standard Example II-2 and Example II-1 to Example II-4 were allowed to stand (at room temperature in a dark location) for 1 week after fabrication of the cells, then measured for the current-voltage characteristics of the cells. The initial values and the results of measurement after standing for 1 week of the cells are shown in Table III-2.

As is clear from the results of Table III-1, the cells of Examples II-1 to II-4 each exhibited a short-circuit photocurrent density, open-circuit photovoltage, fill factor and conversion efficiency equal to that of the cells of the Standard Examples II-1 and II-2 using platinum counter electrodes under irradiation by light, while with the cell of Comparative Example II-1 using the polyaniline conductive substrate prepared by electrolytic polymerization or the cells of Comparative Examples II-2 and II-3 using conductive substrates composed of other conductive polymer thin films, the short-circuit photocurrent density, open-circuit photovoltage, fill factor and conversion efficiency were small.

Further, the cells of Examples II-1 to II-4 using conductive substrates fabricated from polyaniline toluene dispersions were allowed to stand at room temperature in the dark for 1 week, then measured for short-circuit photocurrent density, open-circuit photovoltage, fill factor and conversion efficiency and compared with the values immediately after cell production (initial values).

The cells of Examples II-1 to II-4 maintained the initial values of the short-circuit photocurrent density, open-circuit photovoltage, fill factor and conversion efficiency in the same way as the cells of Standard Examples II-1 and II-1 using platinum counter electrodes.

From the above results, a polyaniline conductive substrate fabricated from the polyaniline toluene dispersion functions as a counter electrode of a photovoltaic device and exhibits a performance equal to the performance of a platinum counter electrode normally used as a counter electrode of a photovoltaic device. Further, the polyaniline conductive substrate of the present invention exhibits the same stability as a platinum counter electrode as a counter electrode of a photovoltaic device.

The clay gel electrode prepared from a layered clay mineral, an organically modified layered clay mineral, and an ionic liquid electrolyte of the present invention has a large short-circuit photocurrent density, open-circuit photovoltage, fill factor and conversion efficiency at the time of irradiation by light and provides a dye-sensitized solar cell free from leakage from between electrodes and superior in stability. In particular, a clay gel electrode prepared from a swelled dispersion of a layered clay mineral or an organically modified layered clay mineral and anionic liquid electrolyte is improved over an ionic liquid electrolyte in short-circuit photocurrent density, open-circuit photovoltage, fill factor and conversion efficiency.

Furthermore, the conductive substrate obtained by coating, on a substrate, a conductive polyaniline dispersion of the present invention stably dispersed in an organic solvent can be easily produced at a lower cost, when compared with an electrode having a platinum thin film conventionally used as a counter electrode of a dye-sensitized solar cell and provide a dye-sensitized solar cell having a performance equal to, or better than, a performance of a dye-sensitized solar cell using an electrode having a platinum thin film.

TABLE III-1

|  | Electrolyte | Counter electrode | Current-voltage characteristic | | | |
| --- | --- | --- | --- | --- | --- | --- |
|  |  |  | Short-circuit photocurrent density (mA/cm$^2$) | Open-circuit photovoltage (mV) | Fill factor | Conversion efficiency (%) |
| Stand. Ex. II-1 | Clay Gel Electrolyte 5 | Platinum | 9.5 | 694 | 0.64 | 4.2 |
| Stand. Ex. II-1 | Clay Gel Electrolyte 9 | Platinum | 11.8 | 662 | 0.63 | 4.9 |
| Ex. II-1 | Clay Gel Electrolyte 5 | PAN1[*1] | 9.4 | 691 | 0.63 | 4.1 |
| Ex. II-2 | Clay Gel Electrolyte 9 | PAN1[*1] | 11.6 | 663 | 0.63 | 4.8 |
| Ex. II-3 | Clay Gel Electrolyte 5 | PAN2[*2] | 9.7 | 690 | 0.63 | 4.2 |

TABLE III-1-continued

|  | Electrolyte | Counter electrode | Short-circuit photocurrent density (mA/cm$^2$) | Open-circuit photovoltage (mV) | Fill factor | Conversion efficiency (%) |
|---|---|---|---|---|---|---|
| Ex. II-4 | Clay Gel Electrolyte 9 | PAN2*$^2$ | 11.7 | 664 | 0.63 | 4.9 |
| Comp. Ex. II-1 | Clay Gel Electrolyte 5 | PAN3*$^3$ | 6.3 | 623 | 0.62 | 2.4 |
| Comp. Ex. II-2 | Clay Gel Electrolyte 9 | PAN3*$^3$ | 8.9 | 603 | 0.61 | 3.2 |
| Comp. Ex. II-3 | Clay Gel Electrolyte 5 | PEDOT*$^4$ | 7.4 | 645 | 0.61 | 2.9 |
| Comp. Ex. II-4 | Clay Gel Electrolyte 9 | PEDOT*$^4$ | 9.2 | 624 | 0.60 | 3.4 |
| Comp. Ex. II-5 | Clay Gel Electrolyte 5 | Sulfonated PAN*$^5$ | 3.2 | 565 | 0.59 | 1.1 |
| Comp. Ex. II-6 | Ionic Liquid Electrolyte 9 | Sulfonated PAN*$^5$ | 4.3 | 542 | 0.56 | 1.3 |

*$^1$Polyaniline Conductive Substrate 1
*$^2$Polyaniline Conductive Substrate 2
*$^3$Polyaniline Conductive Substrate 3
*$^4$Poly(3,4-ethylenedioxythiophen) Conductive Substrate
*$^5$Poly(anilinesulfonic acid) Conductive Substrate

TABLE III-2

|  |  | Time of fabrication of cell (initial value) | | | | After standing 1 week after fabrication of cell | | | |
|---|---|---|---|---|---|---|---|---|---|
|  | Electrolyte | Short-circuit photocurrent density (mA/cm$^2$) | Open-circuit photovoltage (mV) | Fill factor | Conversion efficiency (%) | Short-circuit photocurrent density (mA/cm$^2$) | Open-circuit photovoltage (mV) | Fill factor | Conversion efficiency (%) |
| Stand. Ex. II-1 | Platinum | 9.5 | 694 | 0.64 | 4.2 | 9.3 | 692 | 0.64 | 4.2 |
| Stand. Ex. II-2 | Platinum | 11.8 | 662 | 0.63 | 4.9 | 11.7 | 663 | 0.63 | 4.9 |
| Ex. II-1 | PAN1*$^1$ | 9.4 | 691 | 0.63 | 4.1 | 9.3 | 692 | 0.63 | 4.1 |
| Ex. II-2 | PAN1*$^1$ | 11.6 | 663 | 0.63 | 4.8 | 11.7 | 664 | 0.62 | 4.8 |
| Ex. II-3 | PAN2*$^2$ | 9.7 | 690 | 0.63 | 4.2 | 9.6 | 688 | 0.64 | 4.2 |
| Ex. II-4 | PAN2*$^2$ | 11.7 | 664 | 0.63 | 4.9 | 11.8 | 666 | 0.61 | 4.8 |

*$^1$Polyaniline Conductive Substrate 1
*$^2$Polyaniline Conductive Substrate 2

LIST OF REFERENCES

| 1 | Transparent substrate |
|---|---|
| 2 | Transparent conducting layer |
| 3 | Oxide semiconductor porous film |
| 4 | Photoelectrode |
| 5 | Counter electrode |
| 6 | Electrolyte layer |
| 11 | Transparent substrate (glass) |
| 12 | Transparent conducting layer (FTO) |
| 13 | Oxide semiconductor porous film |
| 14 | Electrolyte layer |
| 15 | Conducting layer (platinum film or polyaniline film) |
| 16 | Transparent conductive layer (FTO) |
| 17 | Conductive substrate |
| 18 | Counter electrode |

The invention claimed is:

1. An electrolyte for a photovoltaic device consisting essentially of (i) a layered clay mineral and/or an organically modified layered clay mineral and (ii) an ionic liquid.

2. The electrolyte for a photovoltaic device as claimed in claim 1, wherein said layered clay mineral and/or organically modified layered clay mineral is formed from a swelled dispersion of solvent and/or ionic liquid.

3. The electrolyte as claimed in claim 1, wherein at least part of exchangeable inorganic ions of said organically modified layered clay mineral is ion exchanged with organic onium ions.

4. The electrolyte as claimed in claim 1, wherein said ionic liquid is at least one member selected from the group consisting of quaternary ammonium salts, imidazolium salts, pyridinium salts and pyrrolidinium salts.

5. A photovoltaic device comprising a photoelectrode including a transparent conducting layer and a metal oxide semiconductor mesoporous film, a counter electrode arranged facing said photoelectrode and an electrolyte layer arranged between said photoelectrode and said counter electrode, wherein electrolyte layer is an electrolyte according to claim 1.

6. The photovoltaic device as claimed in claim 5, wherein the counter electrode of the photovoltaic device is obtained by coating, on a substrate, a conductive polyaniline dispersion stably dispersed in an organic solvent comprising (A) a polyaniline obtained by polymerization of aniline or an aniline derivative, (B) a sulfonic acid compound and/or (C) an organic polymer having a protonic acid group, (D) a molecular weight modifier, and (E) an organic solvent capable of dissolving the sulfonic acid compound (B), the organic polymer having a protonic acid group (C), and the molecular weight modifier (D).

7. The photovoltaic device as claimed in claim 6, wherein said molecular weight modifier is at least one aniline derivative having a substituent at the 4-position.

8. The photovoltaic device as claimed in claim 6, wherein said polyaniline (A) is produced in the presence of a phase transfer catalyst.

9. A dye-sensitized solar cell comprising a photovoltaic device according to claim 5 and a photosensitizing dye carried on the metal oxide semiconductor mesoporous film of the photovoltaic device.

10. The electrolyte as claimed in claim 2, wherein said ionic liquid is at least one member selected from the group consisting of quaternary ammonium salts, imidazolium salts, pyridinium salts and pyrrolidinium salts.

11. A photovoltaic device comprising a photoelectrode including a transparent conducting layer and a metal oxide semiconductor mesoporous film, a counter electrode arranged facing said photoelectrode and an electrolyte layer arranged between said photoelectrode and said counter electrode, wherein electrolyte layer is an electrolyte according to claim 10.

12. The electrolyte as claimed in claim 3, wherein said ionic liquid is at least one member selected from the group consisting of quaternary ammonium salts, imidazolium salts, pyridinium salts and pyrrolidinium salts.

13. A photovoltaic device comprising a photoelectrode including a transparent conducting layer and a metal oxide semiconductor mesoporous film, a counter electrode arranged facing said photoelectrode and an electrolyte layer arranged between said photoelectrode and said counter electrode, wherein the electrolyte layer is an electrolyte according to claim 12.

14. A photovoltaic device comprising a photoelectrode including a transparent conducting layer and a metal oxide semiconductor mesoporous film, a counter electrode arranged facing said photoelectrode and an electrolyte layer arranged between said photoelectrode and said counter electrode, wherein the electrolyte layer is an electrolyte according to claim 2.

15. A photovoltaic device comprising a photoelectrode including a transparent conducting layer and a metal oxide semiconductor mesoporous film, a counter electrode arranged facing said photoelectrode and an electrolyte layer arranged between said photoelectrode and said counter electrode, wherein the electrolyte layer is an electrolyte according to claim 3.

16. A photovoltaic device comprising a photoelectrode including a transparent conducting layer and a metal oxide semiconductor mesoporous film, a counter electrode arranged facing said photoelectrode and an electrolyte layer arranged between said photoelectrode and said counter electrode, wherein the electrolyte layer is an electrolyte according to claim 4.

17. The photovoltaic device as claimed in claim 7, wherein said polyaniline (A) is produced in the presence of a phase transfer catalyst.

18. A dye-sensitized solar cell comprising a photovoltaic device according to claim 6 and a photosensitizing dye carried on a metal oxide semiconductor mesoporous film of the photovoltaic device.

19. A dye-sensitized solar cell comprising a photovoltaic device according to claim 7 and a photosensitizing dye carried on a metal oxide semiconductor mesoporous film of the photovoltaic device.

20. A dye-sensitized solar cell comprising a photovoltaic device according to claim 8 and a photosensitizing dye carried on a metal oxide semiconductor mesoporous film of the photovoltaic device.

* * * * *